United States Patent [19]
Daiku

[11] Patent Number: 5,914,760
[45] Date of Patent: Jun. 22, 1999

[54] SURFACE LIGHT SOURCE DEVICE AND LIQUID CRYSTAL DISPLAY DEVICE USING THE SAME

[75] Inventor: Yasuhiro Daiku, Iruma, Japan

[73] Assignee: Casio Computer Co., Ltd., Tokyo, Japan

[21] Appl. No.: 08/878,412

[22] Filed: Jun. 18, 1997

[30] Foreign Application Priority Data

| Jun. 21, 1996 | [JP] | Japan | 8-161825 |
| Jun. 21, 1996 | [JP] | Japan | 8-161826 |
| Apr. 16, 1997 | [JP] | Japan | 9-098894 |
| Apr. 16, 1997 | [JP] | Japan | 9-098895 |

[51] Int. Cl.$^6$ ............... G02F 1/1335; F21V 7/04; F21V 5/00; F21V 5/02
[52] U.S. Cl. ............... 349/65; 349/62; 349/95; 362/31; 362/331; 362/339
[58] Field of Search ............... 349/1, 62, 65, 349/95; 361/681; 362/26, 31, 331, 339

[56] References Cited

U.S. PATENT DOCUMENTS

| 2,480,178 | 8/1949 | Zinberg . | |
| 4,790,632 | 12/1988 | Miyakawa et al. | 349/95 |
| 4,798,448 | 1/1989 | Van Raalte | 349/95 |
| 5,046,826 | 9/1991 | Iwamoto et al. | 349/62 |
| 5,050,946 | 9/1991 | Hathaway et al. | 385/33 |
| 5,216,263 | 6/1993 | Paoli | 257/88 |
| 5,442,482 | 8/1995 | Johnson et al. | 359/619 |
| 5,555,109 | 9/1996 | Zimmerman et al. | 349/62 |
| 5,594,561 | 1/1997 | Blanchard | 349/62 |
| 5,680,186 | 10/1997 | Watanabe et al. | 349/95 |
| 5,682,215 | 10/1997 | Nishihara et al. | 349/95 |

FOREIGN PATENT DOCUMENTS

| 0167721 A1 | 1/1986 | European Pat. Off. . |
| 0584545 A1 | 3/1994 | European Pat. Off. . |
| 2736486 | 2/1978 | Germany . |
| WO 94/00781 | 1/1994 | WIPO . |

OTHER PUBLICATIONS

Anonymous: "Lens–Prism Optical System" Research Disclosure, No. 112, Aug. 1973.

*Primary Examiner*—Rodney Bovernick
*Assistant Examiner*—Tarifur R. Chowdhury
*Attorney, Agent, or Firm*—Frishauf, Holtz, Goodman, Langer & Chick

[57] ABSTRACT

A surface light source device includes a light source, a light guide plate for guiding light from the light source to one surface, and a light-condensing member for outputting exit light from the light guide plate in a predetermined direction. The one surface of the light guide plate is a stepped surface whose thickness decreases step by step at a predetermined pitch from one end, at which the light source is arranged, to the other. The light-condensing member is located to face the light guide plate and includes a plurality of prisms for refracting exit light from the light guide plate toward the direction of a normal to the light guide plate, and a plurality of lenses for condensing and outputting light in a direction within a predetermined range of angles.

32 Claims, 17 Drawing Sheets

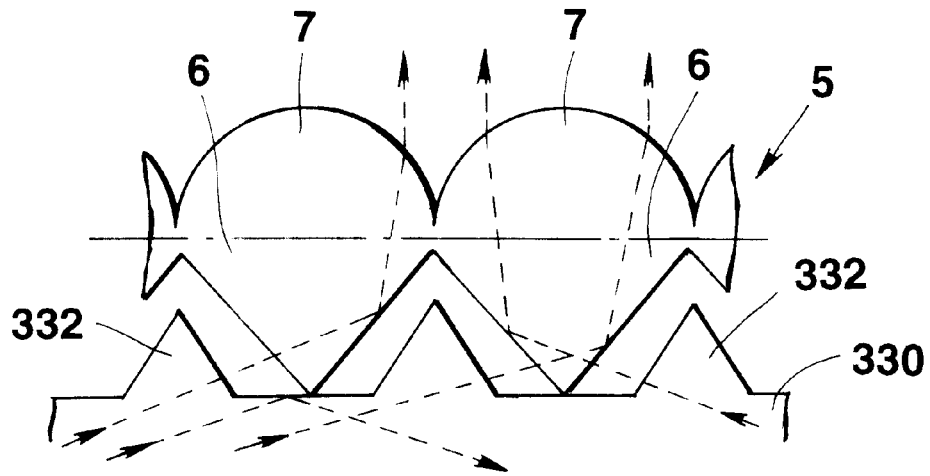
FIG.26
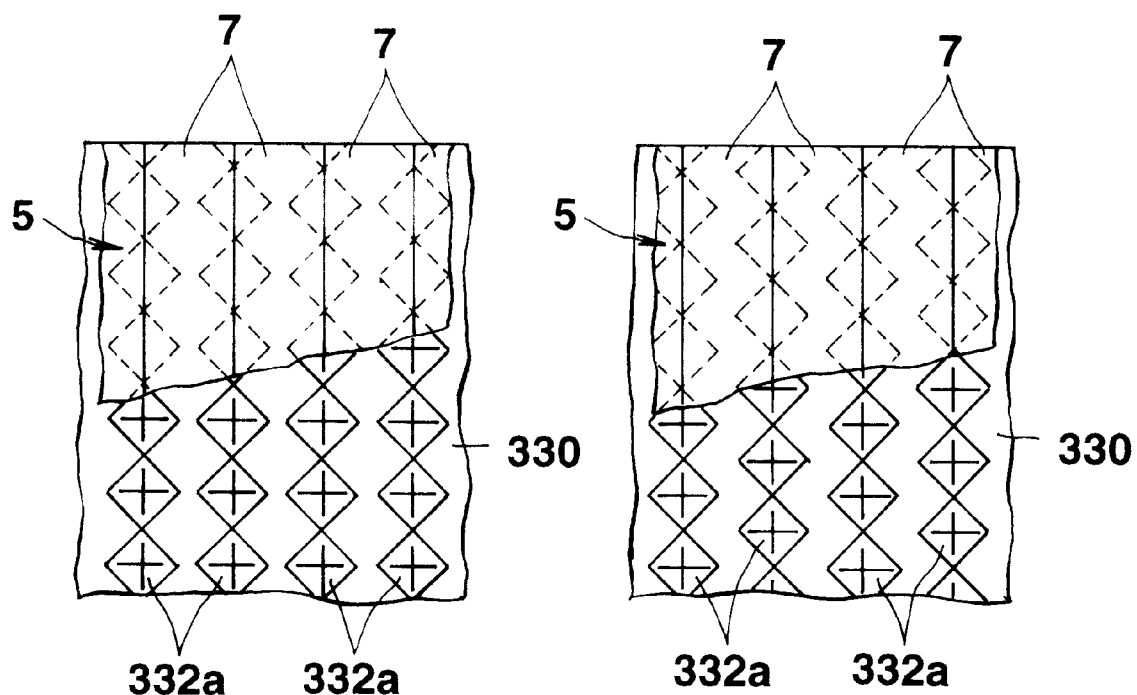
FIG.27A  FIG.27B

SURFACE LIGHT SOURCE DEVICE AND LIQUID CRYSTAL DISPLAY DEVICE USING THE SAME

BACKGROUND OF THE INVENTION

The present invention relates to a surface light source device for obtaining a planar light source by guiding the light from a point or linear light source, and a liquid crystal display device using this surface light source device.

As an illuminating device such as a backlight of a liquid crystal display device, a surface light source device which guides the light from a point or linear light source by using a light guide means and forms a planar light source of a certain area is used.

Some surface light source devices used as, e.g., a backlight of a liquid crystal display device have a light source unit arranged in a side portion and output the light from the light source from its surface. Surface light source devices of this sort are called side lamp type surface light source devices.

One conventionally known side lamp type surface light source device uses a planar light guide plate, and a light source unit. This light source unit comprises a straight-tube fluorescent lamp or an LED array formed by arranging a plurality of LEDs (Light Emitting Diodes) and is arranged to oppose one end face of the light guide plate.

This surface light source device is used such that its front surface, i.e., the surface of the light guide plate faces the incident surface of an object to be illuminated, e.g., a liquid crystal display panel. The incoming light from the light source unit enters the light guide plate from its end face, guided by the light guide plate, and exits from its surface.

In the above conventional surface light source device, however, the light guided in the light guide plate exits from the surface of the light guide plate in various directions. Consequently, a large amount of light exits at very small angles with the surface of the light guide plate and uselessly scattered around. This results in an insufficient quantity of light being output in a frontal direction and its nearby directions, so it is impossible to obtain a high frontal luminance (luminance observed in the frontal direction). Also, the luminance distribution of the exit light is nonuniform.

BRIEF SUMMARY OF THE INVENTION

It is an object of the present invention to provide, as a surface light source device which emits the light from a light source unit arranged in a side portion from the surface, a surface light source device capable of sufficiently increasing the frontal luminance by unwastefully using the light from a light source and also capable of making the luminance distribution of the surface light source nearly uniform, and provide a liquid crystal display device using this surface light source device.

To achieve the above object, a surface light source device according to the first aspect of the present invention comprises a light source, a light guide plate at one end of which the light source is arranged and which has a stepped surface whose thickness decreases step by step at a predetermined pitch from the one end to the other, and guides light from the light source to the stepped surface, and a light-condensing member stacked on the light guide plate to output exit light from the stepped surface of the light guide plate in a direction within a predetermined range.

In this light source device of the present invention, the light guide plate having the stepped surface which lowers step by step at a predetermined pitch from one end to the other guides the light from the light source to the stepped surface. The light-condensing member condenses the exit light from the stepped surface of the light guide member in a predetermined direction. In this light source device, the light from the light source can be unwastefully used. Accordingly, it is possible to sufficiently increase the frontal luminance of the surface light source formed by the exit light from the light guide means consisting of the light guide plate and the light-condensing member. Also, the luminance distribution of the surface light source can be made almost uniform.

In this light source device of the present invention, the light guide plate has a reflection surface for reflecting the light incident from one end, and the stepped surface has raised surfaces for outputting the light guided by the light guide plate. Also, the light-condensing member comprises a prism unit consisting of a plurality of prisms which refract exit light from the raised surfaces of the stepped surface in a direction in which an angle with respect to a normal to an envelope plane of the stepped surface decreases, and a condenser lens unit for condensing and outputting the exit light from the prism unit in a predetermined direction.

The condenser lens unit comprises a plurality of lenses. When Fresnel lenses are used as these lenses, it is possible to prevent the occurrence of moiré fringes caused by a shift between the array pitch of the lenses and the array pitch of the prisms. Also, when these lenses are arranged at a larger pitch than the array pitch of the prisms, moiré fringes resulting from individual pitch shifts can be prevented. Preferably, each lens opposes an odd number of three or more prisms of the prism unit.

The light-condensing member is formed by arranging a plurality of columnar lenses with an almost semicircular section or a polygonal section such as a triangular section.

The light guide plate can also be divided into two plates. These two plates are symmetrically arranged on the right and left sides of the light source. Furthermore, the light guide plate can have a layered structure of transparent films or can be an assembly plate formed by assembling elongated bar-like light guide bodies.

Additionally, it is possible to form a plurality of light guide regions in the light guide plate in a one-to-one correspondence with steps on the stepped surface and form optical interfaces which guide light directed to the outside of these light guide regions in the direction of the light-condensing member. Consequently, light scattered around can be condensed in the frontal direction, and this further increases the frontal luminance.

A surface light source device according to the second aspect of the present invention comprises a light source, a light guide plate at one end of which the light source is arranged and which has a surface having a plurality of projections for outputting light from the light source, which is incident from the one end, to a front surface, a prism unit stacked on the light guide plate and consisting of a plurality of prisms which refract exit light from the light guide plate in a direction in which an angle with respect to a normal to the light guide plate decreases, and a condenser lens member arranged on an exit side of the prism unit and consisting of a plurality of lenses which output exit light from the prism unit in a direction within a predetermined range.

In this light source device, the projections are formed to output the light from the light source, which enters the light guide plate from one end, to the front surface. This increases the quantity of exit light from the light guide plate.

Consequently, it is possible to sufficiently increase the frontal luminance of the surface light source and also increase the utilization ratio of the light from the light source.

Furthermore, a liquid crystal display device using a surface light source according to the third aspect of the present invention comprises a light source, a light guide plate at one end of which the light source is arranged and which has a stepped surface whose thickness decreases step by step at a predetermined pitch from the one end to the other, and guides light from the light source to the stepped surface, a light-condensing member stacked on the light guide plate to output exit light from the stepped surface of the light guide plate in a direction within a predetermined range, and a liquid crystal display element arranged on a light exit side of the light-condensing member and comprising a pair of substrates having electrodes opposing each other and a liquid crystal sealed between the substrates and oriented in a predetermined state.

In this liquid crystal display device using the light source device of the present invention, the light guide plate having the stepped surface which lowers step by step at a predetermined pitch from one end to the other guides the light from the light source to the stepped surface. The condensing member condenses the exit light from the stepped surface of the light guide plate. In this liquid crystal display device, the light from the light source is unwastefully condensed in the direction of a normal to the liquid crystal display element and irradiated on the liquid crystal display element as illuminating light having a uniform luminance distribution. Accordingly, it is possible to sufficiently increase the frontal luminance of the liquid crystal display element and display images with a uniform brightness.

In the light source device of the present invention, the light guide plate has a reflection surface for reflecting light incident from one end, and the stepped surface has a plurality of raised surfaces for outputting light guided by the light guide plate. The light-condensing member comprises a prism unit consisting of a plurality of prisms which refract exit light from the raised surfaces of the stepped surface in a direction in which an angle with respect to a normal to an envelope plane of the stepped surface decreases, and a condenser lens unit for condensing and outputting the exit light from the prism unit in a predetermined direction.

The light-condensing member comprises a plurality of lenses. When Fresnel lenses are used as these lenses, it is possible to prevent the occurrence of moiré fringes caused by a shift between the array pitch of the lenses and the array pitch of the prisms. The light-condensing member is formed by arranging a plurality of columnar lenses with an almost semicircular section or a polygonal section such as a triangular section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 26 is a sectional view showing a portion of the light source device shown in FIG. 24 in an enlarged scale;

FIGS. 27A and 27B are plan views showing the first and second modifications, respectively, of the fourth embodiment;

DETAILED DESCRIPTION OF THE INVENTION

Liquid crystal display devices will be described below as embodiments of the present invention with reference to the accompanying drawings.

First Embodiment

Figure 1:
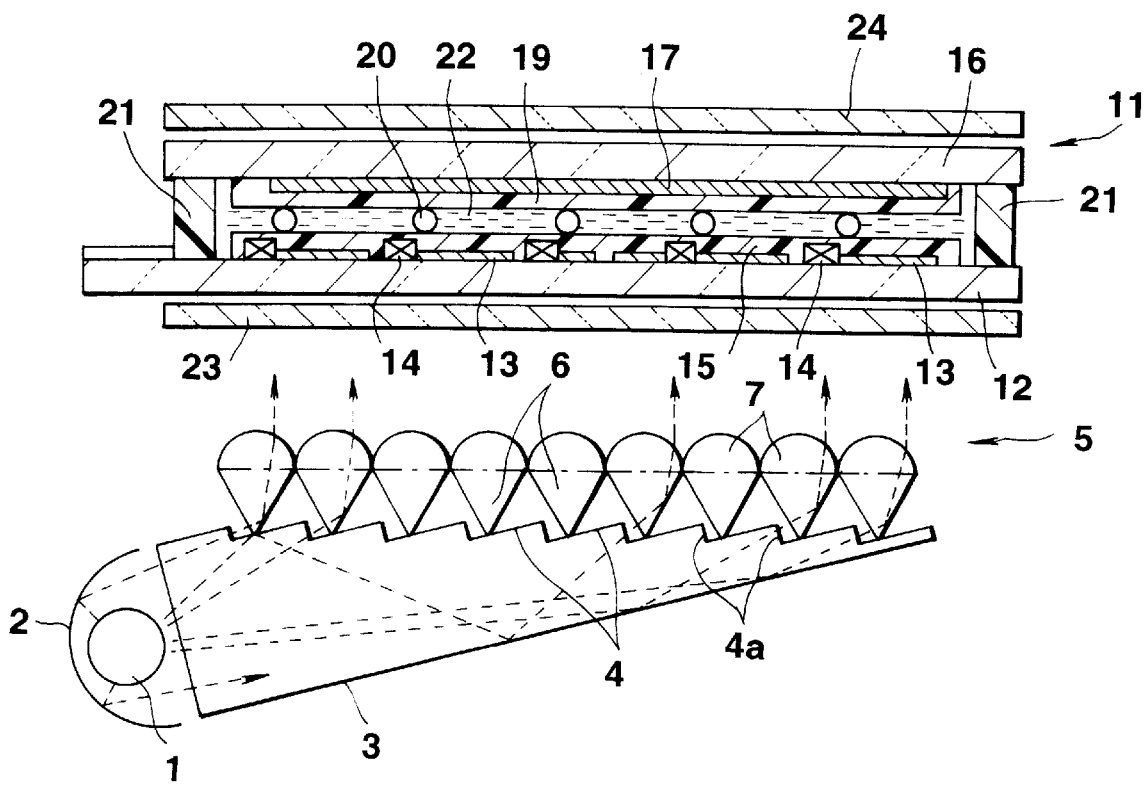
FIG. 1 is a sectional view showing a light source device according to the first embodiment of the present invention and a liquid crystal display device using this light source device.
Figure 2:
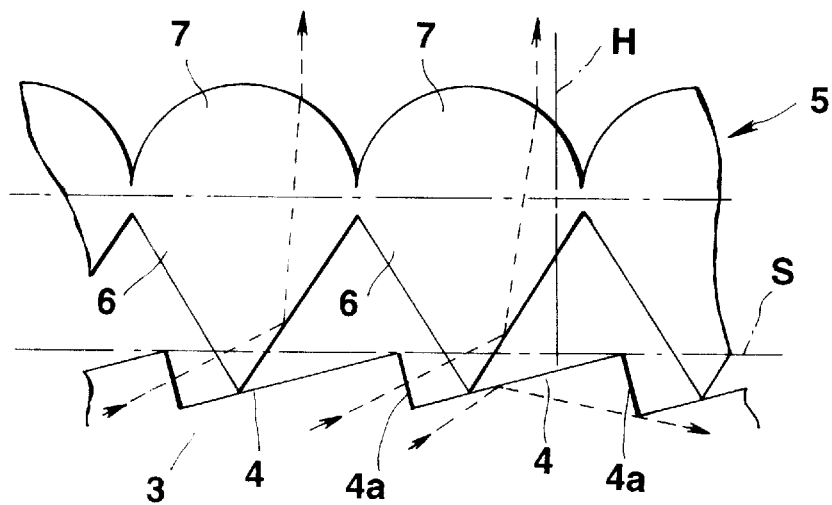
FIG. 2 is an enlarged sectional view showing a portion of the light source device shown in FIG. 1 in an enlarged scale.

FIGS. 1 and 2 show the first embodiment of the present invention. FIG. 1 is a sectional view of a light source device, and FIG. 2 is an enlarged view of a portion of a portion of FIG. 1. Note that in FIGS. 1 and 2, hatching indicating sections is omitted for the sake of simplicity.

This light source device forms a surface light source by guiding light from a point or linear light source 1 by using a light guide means. This light guide means includes a light guide plate 3 and a light-condensing member 5 arranged to oppose the surface of the light guide plate 3.

The light guide plate 3 is a transparent plate made from, e.g., an acrylic resin. The rear surface of the light guide plate 3 is formed into a flat surface, and its front surface is formed into a stepped surface which lowers step by step from one end to the other.

This light guide plate 3 receives light from the end face at the one end and outputs the light from a raised surface 4a of each step 4 on the stepped surface. The incident light from the incident end face is guided in the light guide plate 3 while being alternately reflected by the rear surface of the light guide plate 3 and the top surfaces of the steps 4 on the stepped surface, and leaves from the side or raised surfaces 4a of the steps 4.

The light-condensing member 5 outputs the exit light from the raised surfaces 4a of the steps 4 on the stepped surface of the light guide plate 3 in a predetermined direction. In this embodiment, the light-condensing member 5 includes a plurality of prisms 6 and a plurality of condenser lenses 7. Each prism 6 refracts the exit light from the raised surface 4a of the step 4 in a direction in which the angle with respect to a normal H to a plane S (envelope plane) which envelops the apexes of the stepped surface decreases. The condenser lenses 7 are arranged on the exit side of these prisms 6.

Each prism 6 is an oblong prism which has an inverse triangular sectional shape and the same width as the width of each step on the stepped surface of the light guide plate 3. These prisms 6 are continuously formed parallel to each other in the widthwise direction.

Each condenser lens 7 is an oblong convex lens having nearly the same width as the width of the prism 6 and a substantially semicircular sectional shape. These lenses 7 are formed parallel to each other in a one-to-one correspondence with the prisms 6.

In FIGS. 1 and 2, the boundary between the prisms 6 and the lenses 7 is indicated by the chain line. However, the light-condensing member 5 can also have a structure in which prisms 6 and lenses 7 are formed on the rear and front surfaces of the same transparent plate or a structure in which a transparent plate on one surface of which prisms 6 are formed and a transparent plate on one surface of which lenses 7 are formed are adhered back to back. When the light-condensing member 5 is formed by adhering a transparent plate having prisms 6 and a transparent plate having lenses 7 back to back as in the latter case, it is preferable that these transparent plates and the adhesive have the same refractive index.

The light-condensing member 5 is so arranged that the longitudinal direction of the prisms 6 and the lenses 7 is nearly parallel to the widthwise direction of the light guide plate 3. The prisms 6 are arranged on the front surface side of the light guide plate 3 in a one-to-one correspondence with the steps 4 on the stepped surface of the light guide plate 3, so that the tip of each prism 6 is brought into contact with or positioned close to the top surface of the corresponding step 4 on the stepped surface.

The light source 1 has, e.g., a straight-tube fluorescent lamp and is so arranged as to oppose the incident end face of the light guide plate 3. A curved reflector 2 is arranged behind the light source 1 to reflect the radiated light from the light source 1 toward the incident end face of the light guide plate 3.

An active matrix type liquid crystal display device 11 using TFTs (thin-film transistors) as active elements is arranged on the light exit side of the light-condensing member 5. On the inner surface of a rear substrate 12 on the backside (when viewed from the observation side) of the liquid crystal display device 11, a plurality of pixel electrodes 13 and TFTs 14 connected in a one-to-one correspondence with these pixel electrodes 13 are arranged, and an aligning film 15 is formed on them. At least one transparent counter electrode 17 is formed on a front substrate 16 on the observation side away from the side of the rear substrate 12. This counter electrode 17 opposes all of the pixel electrodes 13 and forms pixel regions in portions opposing these pixel electrodes 13. An aligning film 19 is formed on the counter electrode 17.

The front substrate 16 and the rear substrate 12 are kept apart from each other with a predetermined gap by gap members 20 interposed between them and are connected by a frame-like seal member 21. A liquid crystal 22 is filled in the region surrounded by the seal member 21 between the two substrates 12 and 16.

The aligning films 15 and 19 formed on the inner surfaces of the pair of substrates 12 and 16 have undergone an aligning treatment by rubbing their film surfaces their in respective predetermined directions. The aligning directions of liquid crystal molecules between the two substrates 12 and 16 are regulated in the vicinities of the substrates 12 and 16 by the aligning film 15 on the rear substrate 12 and the aligning film 19 on the front substrate 16. Consequently, these liquid crystal molecules are twisted at a predetermined twist angle (e.g., nearly 90°) between the two substrates 12 and 16.

Polarizing plates 23 and 24 are arranged on the outer surfaces of the pair of substrates 12 and 16, respectively, such that the transmission axes of these polarizing plates 23 and 24 are pointed in their respective predetermined directions. In the case of a TN type liquid crystal display device, for example, the transmission axis of one polarizing plate is arranged to be parallel or perpendicular to the aligning direction of an aligning film of an adjacent substrate, and the transmission axes of two polarizing plates are arranged to be perpendicular to each other.

When this light source device is in use, the front of the light source device, i.e., the surface of the light-condensing member 5 arranged on the front surface of the light guide plate 3 is opposed to the incident surface of an object to be illuminated, e.g., a liquid crystal panel. The paths of light from the light source 1 are indicated by the broken lines in FIGS. 1 and 2. That is, the light from the light source 1 enters the light guide plate 3 from its incident end face and most of light is guided in this light guide plate 3 while being alternately reflected by the rear surface and the surfaces of the steps 4 on the stepped surface of the light guide plate 3. Light incident on the raised surface 4a of each step 4 is outwardly emitted from this raised surface 4a and enters into the light-condensing member 5.

The incident light is refracted by the prisms 6 of the light-condensing member 5 in the direction in which the angle with respect to the normal H to the envelope plane S along the stepped surface decreases. The refracted light is transmitted through the condenser lens 7 provided on the exit side of each prism 6 and emerges toward the liquid crystal display device 11, thereby illuminating the liquid crystal display device.

In this light source device, most of the light from the light source 1 can be output in a predetermined direction. Therefore, it is possible to unwastefully use the light from the light source 1 and sufficiently increase the frontal luminance of the surface light source formed by the light leaving the light guide means formed by the light guide plate 3 and the light-condensing member 5. Also, components of the light entering the light guide plate 3 from the light source 1 are outwardly emitted from the raised surfaces 4a of the steps 4 on the stepped surface of this light guide plate 3 and enter the light-condensing member 5. Accordingly, the luminance distribution of the surface light source can be made almost uniform.

Additionally, in the light source device of this embodiment, the light-condensing member 5 is constituted by the prisms 6 each of which refracts the exit light from the raised surface 4a of the corresponding step 4 on the stepped surface of the light guide plate 3 in the direction in which the angle with respect to the normal H to the envelope plane S of the stepped surface decreases, and the condenser lenses 7 arranged on the exit side of the prisms 6. Therefore, the exit light from the raised surfaces 4a of the steps 4 on the stepped surface of the light guide plate 5 can be refracted by the prisms 6 and condensed in a predetermined direction by the condenser lenses 7. This further increases the frontal luminance of the surface light source and makes its luminance distribution more uniform. As a consequence, a liquid crystal display device which is bright when viewed from the front and has a uniform brightness can be obtained.

In the above embodiment, each condenser lens 7 of the light-condensing member 5 is a convex lens whose section is nearly semicircular. However, this condenser lens 7 can also be a Fresnel lens. When these condenser lenses 7 are Fresnel lenses, the valleys between the adjacent condenser lenses 7 become shallow, and this makes the shadows of these valleys almost inconspicuous. This results in a more uniform luminance distribution.

Figure 3:
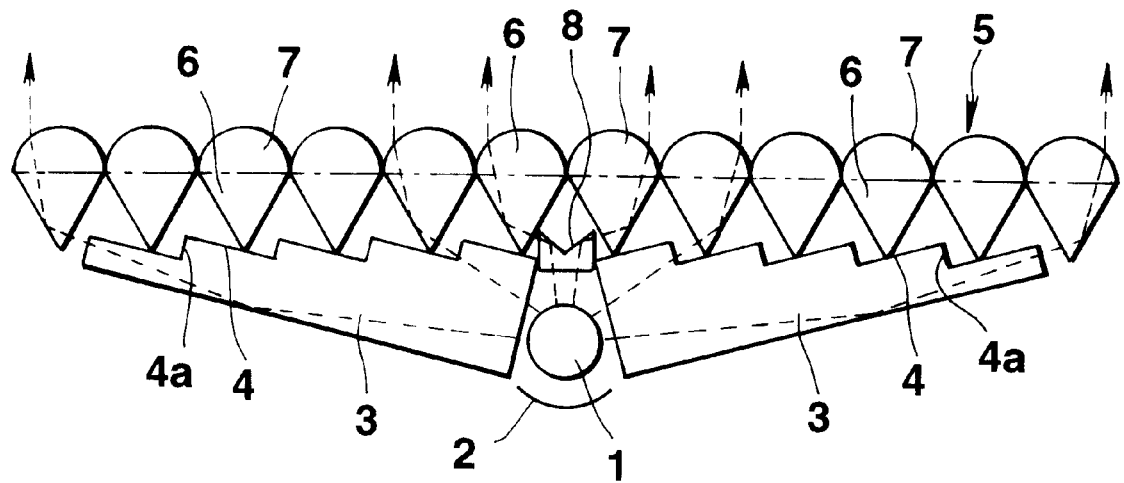
FIG. 3 is a sectional view showing the first modification of the first embodiment shown in FIG. 1.
Figure 4:
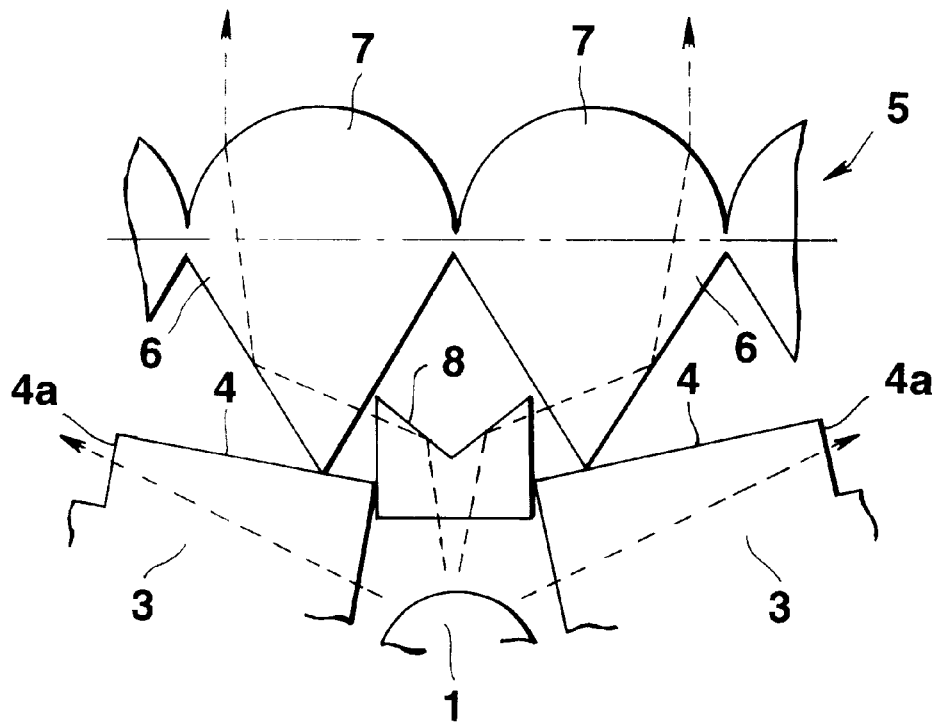
FIG. 4 is an enlarged sectional view showing a portion of the light source device shown in FIG. 3 in an enlarged scale.

FIGS. 3 and 4 show the first modification of the first embodiment of the present invention. FIG. 3 is a sectional view of a light source device, and FIG. 4 is an enlarged view of a part of FIG. 3. Note that in FIGS. 3 and 4, hatching indicating sections is omitted for the sake of simplicity.

In this light source device, a light guide means for forming a surface light source by guiding the light from a linear light source 1 is constituted by two light guide plates 3. These two light guide plates 3 are so arranged that their front surfaces (stepped surfaces) are pointed in the same direction and their incident end faces are opposed to each other. The linear light source 1 is arranged between the incident end faces of the two light guide plates 3. Also, a light-condensing member 5 having an area covering the entire surface area of the two light guide plates 3 is arranged to oppose the surfaces of the light guide plates 3.

In principle, the light source device of this modification is obtained by symmetrically arranging two light source devices of the first embodiment on the right and left sides of the linear light source 1. That is, the structures of the light guide plate 3 and the light-condensing member 5 are the same as in the first embodiment. Therefore, the same reference numerals as in the first embodiment denote the same parts, and a detailed description thereof will be omitted.

In this modification, however, the right and left light guide plates 3 are so arranged that the envelope planes of their stepped surfaces are level with each other, and the light-condensing member 5 is arranged on this surface side so as to be almost parallel to these envelope planes.

Also, the light-condensing member 5 of this modification has prisms 6 and lenses 7 in its central portion, i.e., in portions corresponding to end portions near the incident end faces of the right and left light guide plates 3. Additionally, an oblong refracting member 8 having an almost M sectional shape is provided on the opposite surface side of a space to the reflector 2 side, in which the light source is arranged, between the two light guide plates 3 (between the incident end faces). The refracting member 8 refracts the light from the linear light source 1 toward the prisms 6 in the central portion of the light-condensing member 5.

In the light source device of this modification, almost of light from the linear light source 1 enters the right and left light guide plates 3 from their end faces and exits from raised surfaces 4a of steps 4 on the stepped surfaces of these light guide plates 3. The exit light is output in a predetermined direction by the prisms 6 and the lenses 7 of the light-condensing member 5 arranged to oppose the front surfaces (stepped surfaces) of the light guide plates 3. Also, the component of light emitted from the linear light source 1 toward the surface side through the space between the two light guide plates 3 is refracted by the refracting member 8 and output in a predetermined direction by the prisms 6 and the lenses 7 in the central portion of the light-condensing member 5. In this light source device, therefore, it is possible to sufficiently increase the frontal luminance of the surface light source by unwastefully using the light from the light source 1. It is also possible to make the luminance distribution of the surface light source almost uniform and obtain a wider surface light source.

Figure 5:
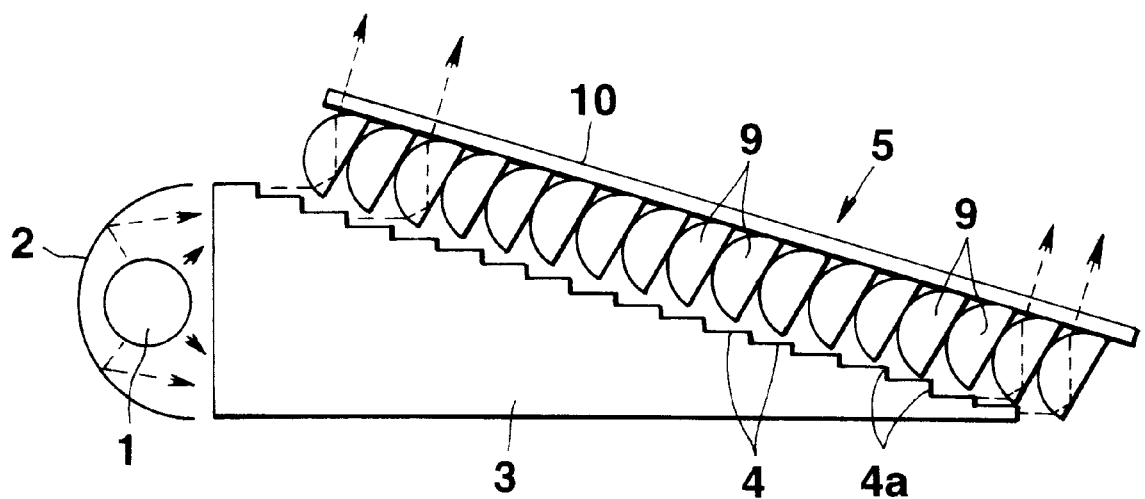
FIG. 5 is a sectional view showing the second modification of the first embodiment.
Figure 6:
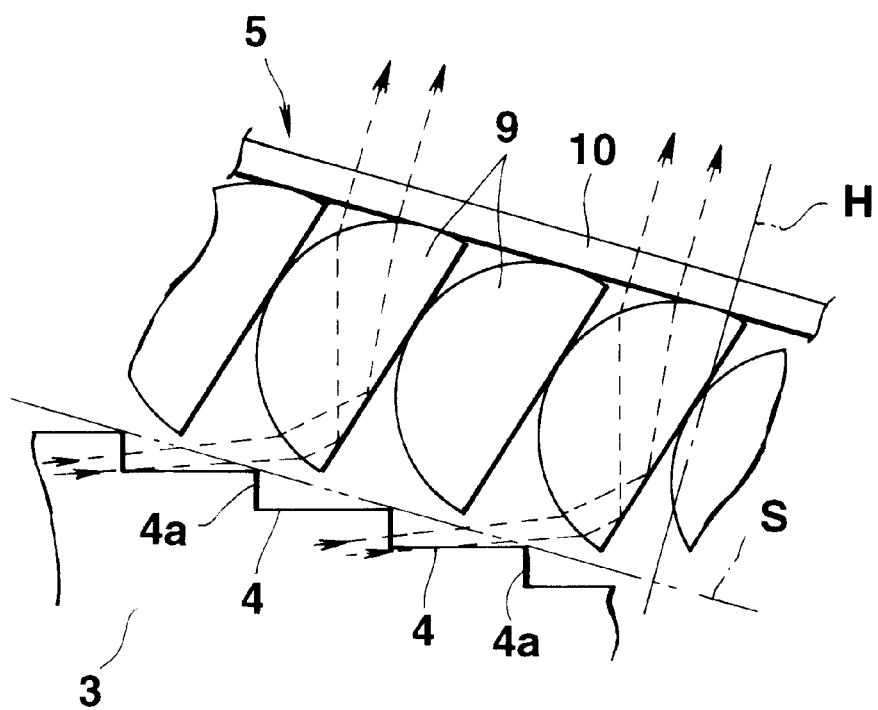
FIG. 6 is an enlarged sectional view showing a portion of the light source device shown in FIG. 5 in an enlarged scale.

FIGS. 5 and 6 show the second modification of the first embodiment of the present invention. FIG. 5 is a sectional view of a light source device, and FIG. 6 is an enlarged view of a part of FIG. 5. Note that in FIGS. 5 and 6, hatching indicating sections is omitted for the sake of simplicity.

In this light source device, a light-condensing member 5 for outputting the exit light from raised surfaces 4a of steps 4 on the stepped surface of a light guide plate 3 in a predetermined direction is constituted by a plurality of oblong lenses 9 arranged parallel to each other along the widthwise direction of the light guide plate 3. These oblong lenses 9 are convex lenses having a nearly semicircular section and so arranged that their flat surfaces are uniformly raised at a predetermined angle with an envelope plane S of the stepped surface of the light guide plate 3. Also, the edges of these oblong lenses 9 adjacent to the light guide plate 3 are opposed to the respective corresponding raised surfaces 4a of the steps 4 on the stepped surface of the light guide plate 3.

That is, in this modification, the oblong lenses 9 constituting the light-condensing member 5 are so arranged that their convex lens surfaces are pointed in the direction of the incident end face of the light guide plate 3 and their flat surfaces are pointed in the direction of the other end face of the light guide plate 3. Additionally, these oblong lenses 9 are sequentially shifted, from the one closest to the incident end face of the light guide plate 3, by the same height as the step height of each step 4 on the stepped surface of the light guide plate 3, so that the oblong lenses 9 are arranged along the stepped surface of the light guide plate 3. The edge of each oblong lens 9 adjacent to the light guide plate 3 is opposed to the raised surface 4a of the corresponding step 4 on the stepped surface of the light guide plate 3 with a space formed between the edge and the raised surface 4a.

Also, in this modification, these oblong lenses 9 are fixed by means of, e.g., adhesion, to a flat transparent plate 10 which forms the surface of the light-condensing member 5. This transparent plate 10 and the light guide plate 3 are held by a support member (not shown) with a predetermined positional relationship between them.

In the light source device of this modification, the light-condensing member 5 is constituted by the oblong lenses 9 described above. However, the rest of the arrangement is basically identical with that of the first embodiment. Therefore, the same reference numerals as in the first embodiment denote the same parts, and a detailed description thereof will be omitted.

In the light source device of this modification, components of the light leaving the raised surfaces 4a of the steps 4 on the stepped surface of the light guide plate 3 are refracted by the flat surfaces of the respective corresponding oblong lenses 9 of the light-condensing member 5 and condensed in a predetermined direction by the condensing action of the lenses 9. Consequently, in this light source device it is possible to sufficiently increase the frontal luminance of the surface light source and make its luminance distribution nearly uniform, as in the light source devices described previously.

In this modification, the oblong lenses 9 constituting the light-condensing member 5 are so arranged that their convex lens surfaces are pointed in the direction of the incident end face of the light guide plate 3. However, these oblong lenses 9 can also be so arranged that their flat surfaces are pointed in the direction of the incident end face of the light guide plate 3 and their convex lens surfaces are pointed in the direction of the other end face of the light guide plate 3. Even in this case, the oblong lenses 9 are similarly arranged so that their flat surfaces are uniformly raised at a predetermined angle with respect to the envelope plane S of the stepped surface of the light guide plate 3. Consequently, components of the light emitted from the raised surfaces 4a of the steps 4 on the stepped surface of the light guide plate 3 can be refracted by the flat surfaces of the oblong lenses 9 and condensed in a predetermined direction by the condensing action of the lenses 9.

Figure 7:
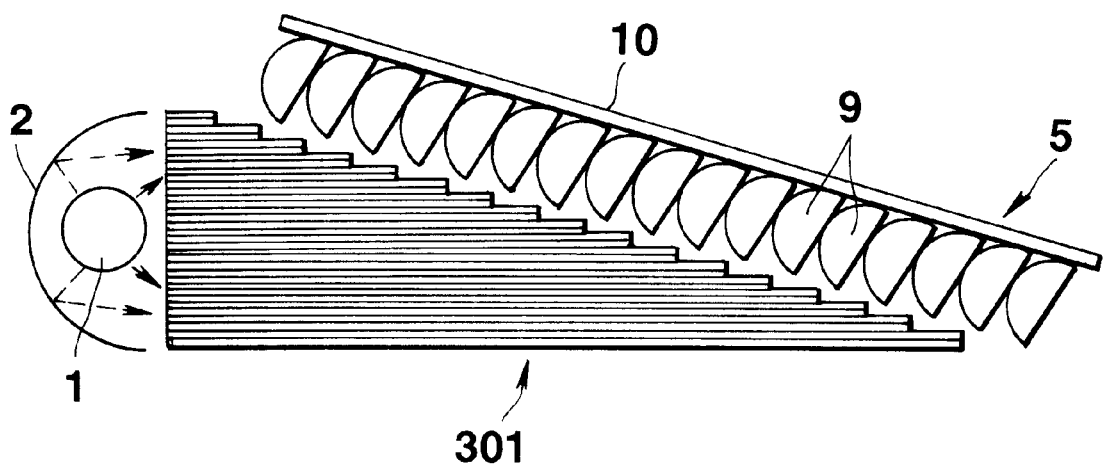
FIG. 7 is a sectional view showing the third modification of the first embodiment.
Figure 8:
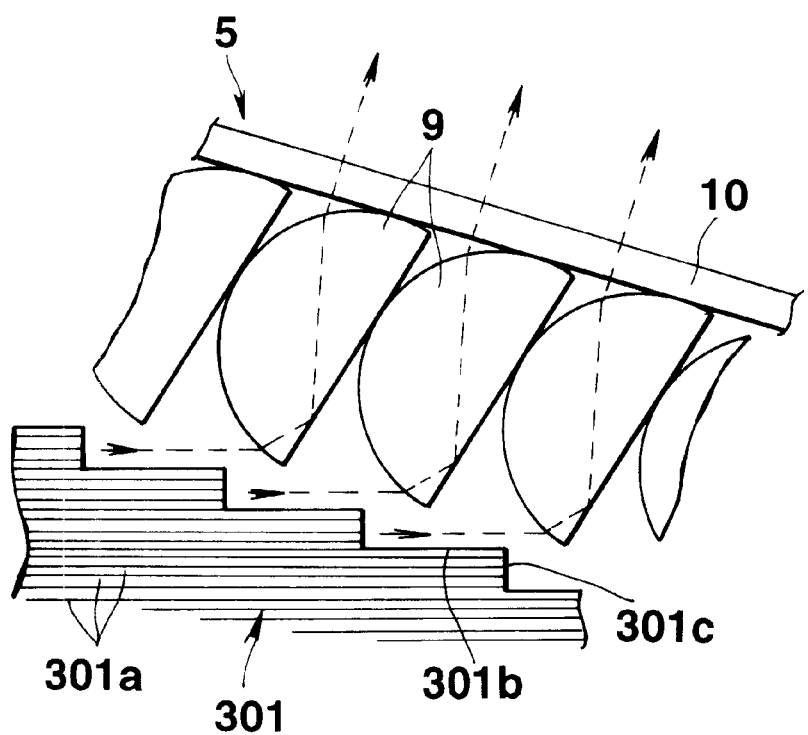
FIG. 8 is an enlarged sectional view showing a portion of the light source device shown in FIG. 7 in an enlarged scale.

FIGS. 7 and 8 show the third modification of the first embodiment of the present invention.

A light source device of this modification uses a light guide plate 301 which is an optical waveguide assembly plate, instead of the light guide plate 3, which is a transparent plate having a stepped surface, used in the light source device of the second modification.

That is, this light guide plate 301 is an optical waveguide assembly plate in which a large number of very thin optical waveguides 301a for guiding light in the axial direction are densely assembled parallel to each other. One end face of each optical waveguide 301a is used as a light-receiving surface, and the other end face is used as an exit surface. Also, the lengths of these optical waveguides 301a are shortened step by step in units of groups from the rear surface to the front surface of the light guide plate. In this modification, the optical waveguide assembly plate has a layered structure formed by stacking optical fibers or transparent films as the optical waveguides 301a.

This light guide plate 301 constructed by optical fibers can be easily manufactured by, e.g., the following method. That is, a predetermined number of optical fibers are densely assembled and adhered parallel to each other to form an element having the same width as the width of the light guide plate 301 and a thickness equal to the height of one step 301b on the stepped surface of the light guide plate. The resultant element is cut into a plurality of plates having different lengths, and these plates are stacked and adhered to each other with their end faces on one side aligned.

Although the light source device of this modification uses the light guide plate 301 made of the optical waveguide assembly plate, the rest of the arrangement is the same as that of the second modification. Therefore, the same reference numerals as in the second modification denote the same parts, and a detailed description thereof will be omitted.

In this light source device, components of the light entering from the incident end face of the light guide plate 301 made of the optical waveguide assembly plate described above are guided in the optical waveguides 301a in their axial direction and emerge substantially parallel to each other from the other end face, i.e., raised surfaces 301c of the steps 301b on the stepped surface of the light guide plate 301. Therefore, the exit light components from the raised surfaces 301c of the steps 301b can efficiently enter oblong lenses 9 of a light-condensing member 5 arranged to oppose the surface of the light guide plate 301. Consequently, it is possible to sufficiently increase the frontal luminance of the surface light source by further unwastefully using the light from a light source 1 and make the luminance distribution of the surface light source almost uniform.

Figure 9:
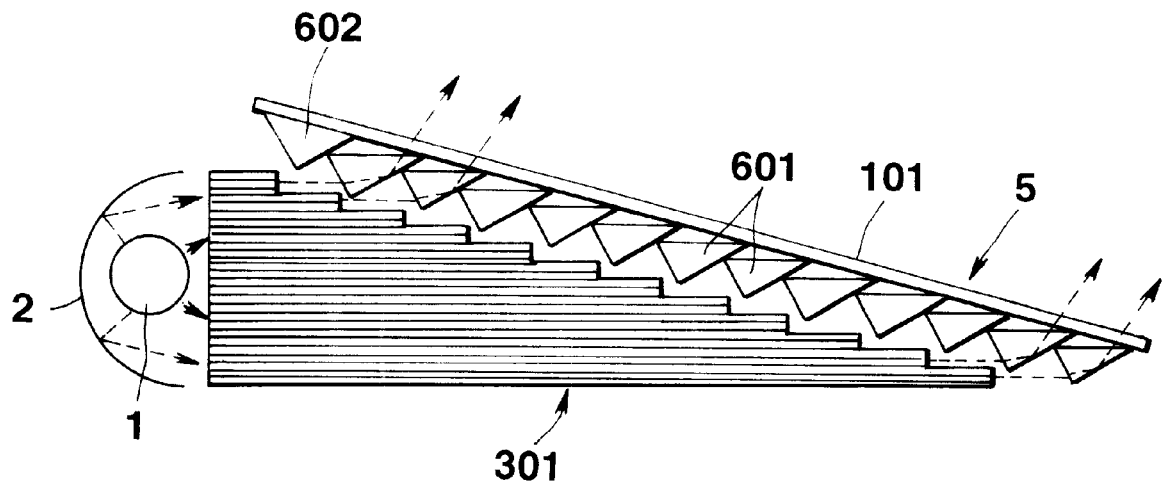
FIG. 9 is a sectional view showing the fourth modification of the first embodiment.
Figure 10:
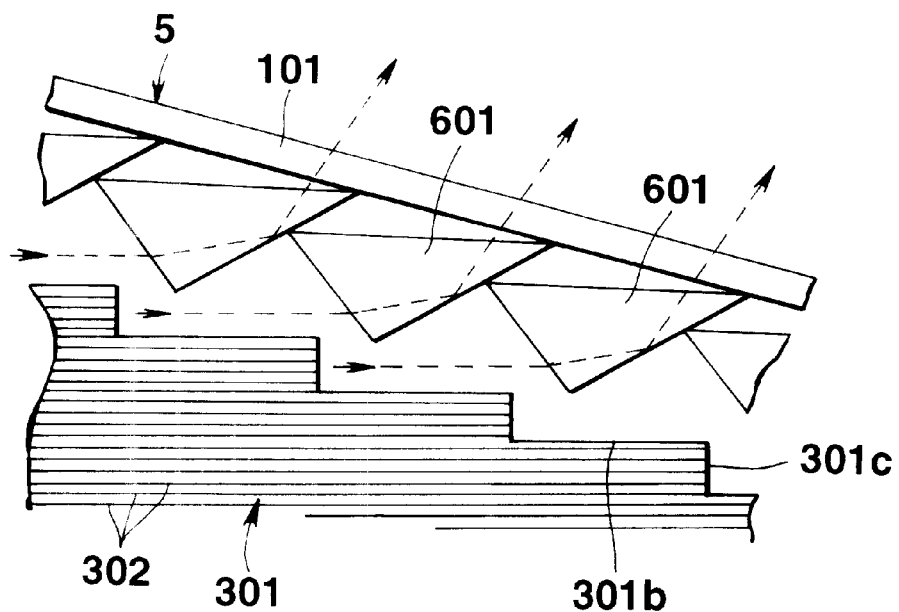
FIG. 10 is a sectional view showing a portion of the light source device shown in FIG. 9 in an enlarged scale.

FIGS. 9 and 10 show the fourth modification of the first embodiment of the present invention.

A light source device of this modification uses a light guide plate 301 which is the same optical waveguide assembly plate as in the third embodiment. Also, a light-condensing member 5 for outputting the exit light from raised surfaces 301c of steps 301b on the stepped surface of this light guide plate 301 is constituted by a plurality of oblong prisms 601 arranged parallel to each other in the widthwise direction of the light guide plate 301. The edges of these oblong prisms 601 adjacent to the light guide plate 301 are opposed to the raised surfaces 301c of the respective corresponding steps 301b on the stepped surface of the light guide plate 301.

That is, in this modification, these oblong prisms 601 constituting the light-condensing member 5 are sequentially shifted, from the one closest to the incident end face of the light guide plate 301, by the same height as the step height of each step 301b on the stepped surface of the light guide plate 301. Additionally, the edge of each oblong prism 601 adjacent to the light guide plate 301 is opposed to the raised surface 301c of the corresponding step 301b on the stepped surface of the light guide plate 301 with a space formed between the edge and the raised surface 301c.

This modification further comprises a flat transparent plate 101 which forms the surface of the light-condensing member 5. The posture of the oblong prism 601 at the end of the prism array is defined by supporting it by a support member 602 formed on the rear surface at one end of the transparent plate 101. Also, the postures of the other oblong prisms 601 are defined by supporting them by their respective preceding oblong prisms 601. These oblong prisms 601 are fixed to the transparent plate 101 by means of, e.g., adhesion, and the transparent plate 101 and the light guide plate 301 are held by a support member (not shown) with a predetermined positional relationship between them.

In the light source device of this modification, the light-condensing member 5 is constituted by the oblong prisms 601. However, the rest of the arrangement is basically identical with the third embodiment. Therefore, the same reference numerals as in the third embodiment denote the same parts, and a detailed description thereof will be emitted.

In the light source device of this modification, components of the exit light from the raised surfaces 301c of the steps 301b on the stepped surface of the light guide plate 301 are refracted and condensed in a predetermined direction by the oblong prisms 601 of the light-condensing member 5. This light source device can also well increase the frontal luminance of the surface light source and make its luminance distribution nearly uniform.

The light guide plate 301 used in this modification is an optical waveguide assembly plate in which a large number of optical waveguides 302 with a very small diameter for guiding light in the axial direction are densely assembled parallel to each other. This light guide plate can also be a transparent plate having a stepped surface described above.

When, however, the prisms are used as the light-condensing member 5 as in this light source device, it is preferable to use the optical waveguide assembly plate as the light guide plate 301. When this light guide plate 301 is used, components of the light entering from the incident end face of the light guide plate 301 are guided in the optical waveguides 302 in their axial direction and emerge substantially parallel to each other from the other end face, i.e., the raised surfaces 301c of the steps 301b on the stepped surface of the light guide plate from the raised she exit light from the raised surface 301c of each step 301b can be efficiently fed into the corresponding oblong prism 601.

Figure 11:
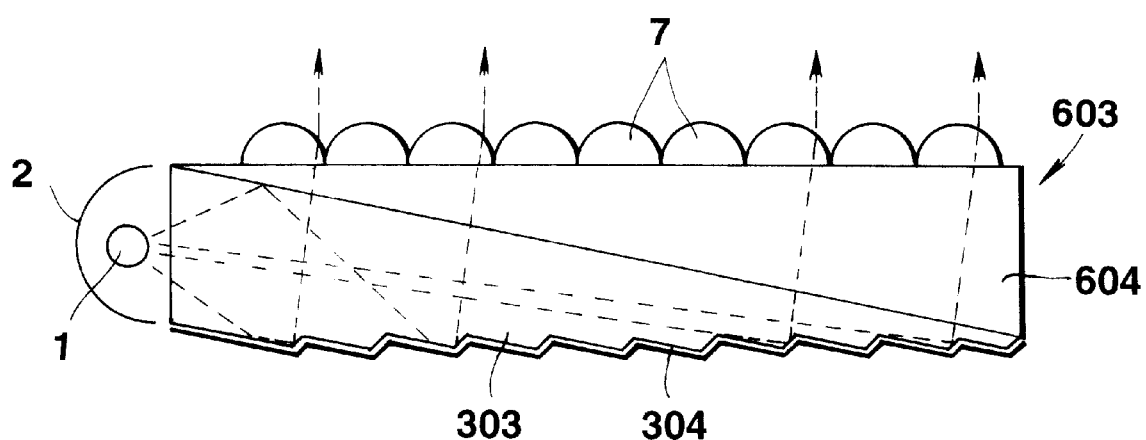
FIG. 11 is a sectional view showing the fifth modification of the first embodiment.

FIG. 11 shows the fifth modification of the first embodiment of the present invention. In a light source device of this modification, a light guide plate 303 is a wedge plate whose front surface is inclined such that the plate thickness decreases from the incident end portion to the other. Also, the rear surface of the light guide plate 303 is a stepped surface which reflects light entering from the incident end face toward the front surface of the light guide plate. A reflecting film 304 is formed on this stepped rear surface. A light-condensing member 603 includes a transparent substrate 604 closely adhered to the front surface of the light guide plate 303 with no spacing between them, and a plurality of condenser lenses 7 formed on the surface of this substrate 604. In this modification, the substrate 604 of the light-condensing member 603 is a wedge plate whose inclination is the reverse of that of the light guide plate 303.

In this light source device, the light entering from the end face of the light guide plate 303 is reflected toward the front surface of the light guide plate 303 by the stepped rear surface of the light guide plate 303. The light emerging from the front surface is guided by the substrate 604 of the light-condensing member 603 in the direction of thickness of the substrate 604, and condensed in a predetermined direction by the condenser lenses 7 formed on the surface of the substrate 604. In this light source device, it is possible to sufficiently increase the frontal luminance of the surface light source formed by the exit light from the light guide means comprising the light guide plate 303 and the light-condensing member 603. It is also possible to increase the utilization efficiency of the light from a light source 1.

In the first embodiment described above, a straight-tube fluorescent lamp is used as the linear light source 1. However, the light source 1 can also be an LED array in which a plurality of LEDs (Light Emitting Diodes) are arranged, for example in a matrix pattern.

Second Embodiment

The second embodiment of the present invention will be described below. A surface light source device of this second embodiment comprises a light guide plate with a stepped front surface and a light-condensing member including a plurality of prisms and a plurality of condenser lenses. The light guide plate receives light from one end face and outputs the light from each raised surface on the stepped surface. The prisms of the light-condensing member receive and refract the exit light from the raised surfaces on the stepped surface of the light guide plate. The condenser lenses of the light-condensing member refract and output the light guided to the front surface in a condensing direction. The light-condensing member is divided into a plurality of light guide regions. Light guide surfaces are formed on the two sides of each light guide region. Of the light refracted by the prism and guided to the light guide region, the light guide surfaces refract light traveling to the outside of the condenser lens corresponding to that light guide region and guide the refracted light to the condenser lens.

The second embodiment of the present invention will be described below with reference to FIGS. 12 to 14. This second embodiment is identical with the above first embodiment except for the construction of the light-condensing member. Therefore, the same reference numerals as in the first embodiment denote the same parts, and a detailed description thereof will be omitted.

Figure 12:
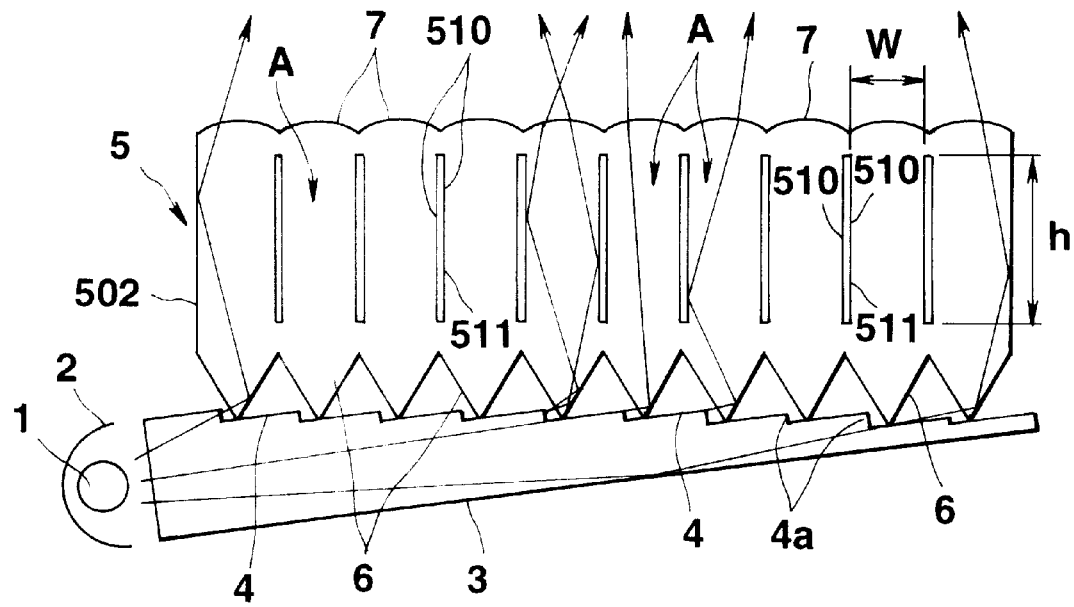
FIG. 12 is a sectional view showing a surface light source device according to the second embodiment.
Figure 13:
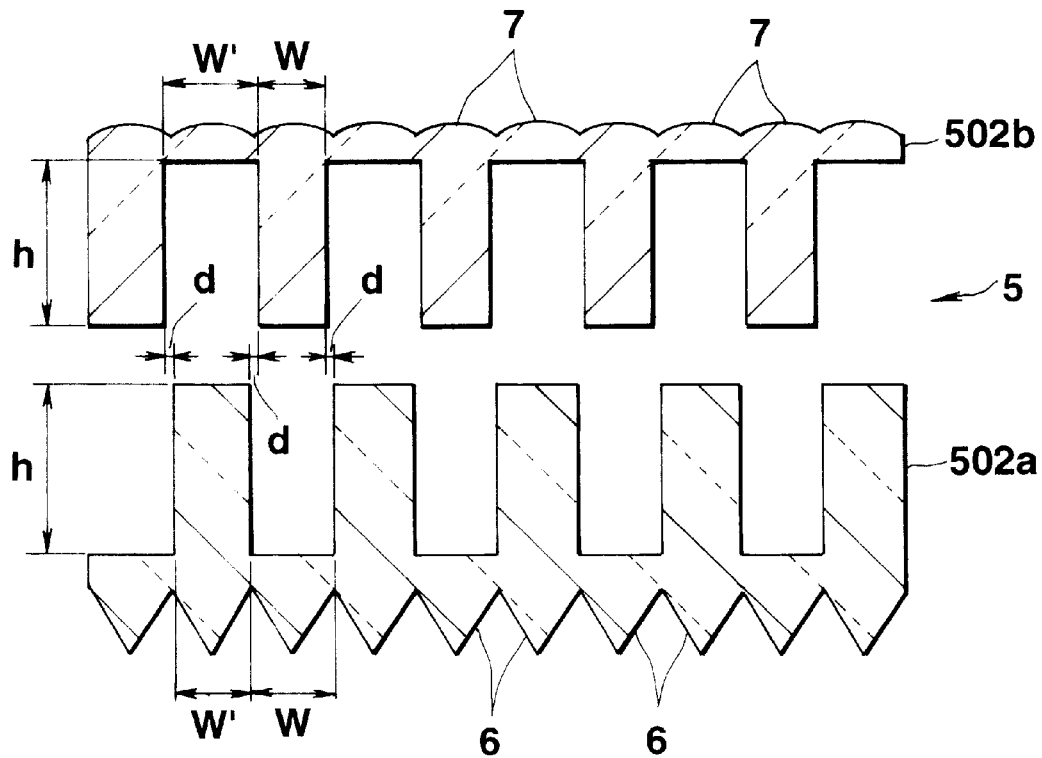
FIG. 13 is an exploded sectional view showing the structure of a light guide plate used in the surface light source device according to the second embodiment shown in FIG. 12.

As shown in FIG. 12, this surface light source device comprises a light guide plate 3, a light source 1 arranged on the side of the light guide plate 3 so as to oppose the incident end face of the light guide plate 3, and a light-condensing member 5 arranged on the surface of the light guide plate 3.

The light guide plate 3 has the same construction as the light guide plate 3 described in the first embodiment. The step pitch of the stepped surface is set to be the same as or an integral fraction of the pixel pitch of the liquid crystal display panel shown in FIG. 1.

In the light-condensing member 5 arranged on the upper surface of the light guide plate 3, the interior of a transparent plate 502 is divided into a plurality of light guide regions A, arranged at the same pitch as the step pitch on the stepped surface of the light guide plate 3, by optical interfaces 510. A plurality of prisms 6 are formed on the rear surface of the transparent plate 502 in a one-to-one correspondence with the light guide regions A. Each prism 6 receives light emerging from a corresponding raised surface 4a on a stepped surface 4 of the light guide plate 3 and refracts the light toward the corresponding light guide region A. A plurality of condenser lenses 7 are formed on the exit surface of the transparent plate 502 in a one-to-one correspondence with the light guide regions A. These condenser lenses 7 refract and output the light guided to the light guide regions A in a condensing direction. The optical interfaces 510 are arranged in the boundary planes on the two sides of each light guide region A and include a reflecting surface and/or a refracting surface. Of the light refracted and guided to the light guide region A by the prism 6, the reflecting surface and/or the refracting surface reflects or refracts light proceeding to the outside of the condenser lens 7 corresponding to that light guide region A and guides the reflected or refracted light to the condenser lens 7.

The optical interfaces 510 are vertically formed from a position slightly inside the transparent plate 502 from the valley between the prisms 6 to a position slightly inside the transparent plate 502 from the valley between the condenser lenses 7. Accordingly, a height h of the light guide region A is essentially the same as the height of the optical interface 510.

In this embodiment, the array pitch of the light guide regions A is the same as the step pitch of the stepped surface of the light guide plate 3. Therefore, a width W of the light guide region A is nearly the same as or an integral fraction of the pixel width of a liquid crystal display panel. Note that the light guide region A is a vertically long region whose height h is larger than its width W, and it is desirable that the height h be at least twice as large as the width W.

Additionally, in this light-condensing member 5, low-refractive index layers 511 made from a substance whose optical refractive index is smaller than that of the transparent plate 502 are formed in the boundaries between the light guide regions A in the transparent plate 502. The optical interface 510 is formed by the interface between this low-refractive index layer 511 and the transparent plate 502.

The low-refractive index layer 511 need only be a layer made from a substance whose refractive index is much smaller than that of the transparent pate 502. In this embodiment, the low-refractive index layer 511 is an air layer with the smallest refractive index.

The light-condensing member 5 can be manufactured by the following method. FIG. 13 is an exploded sectional view showing the structure of the light-condensing member 5. As in FIG. 13, the light-condensing member 5 is formed by combining a first transparent plate 502a and a second transparent plate 502b.

The prisms 6 are densely arranged on one surface of the first transparent plate 502a, and vertically long projecting portions are formed on the other surface such that each projecting portion opposes every other prism 6. The condenser lenses 7 are densely formed on one surface of the second transparent plate 502b, and vertically long projecting portions having the same shape as the projecting portions of the first transparent plate 502a are formed in a one-to-one correspondence with the condenser lenses 7 corresponding to the prisms 6 between the projecting portions of the first transparent plate 502a. Note that both the first and second transparent plates 502a and 502b are molded products or cut products made from a transparent resin such as an acrylic resin.

Each projecting portion of these transparent plates 502a and 502b has a vertically long rectangular section having the same width and height as the width W and the height h of the light guide region A. A width W' of the space between the projecting portions is so set as to be slightly larger than the width W of the projecting portion.

The light guide plate 5 is manufactured as follows. That is, the first and second transparent plates 502a and 502b are assembled such that the projecting portions of one transparent plate are inserted into the spaces between the adjacent projecting portions of the other transparent plate and all distances d between the side surfaces of the projecting portions are equal. The end faces of the projecting portions and the bottom surfaces of the spaces are adhered by a transparent adhesive (not shown).

When the first and second transparent plates 502a and 502b are thus assembled, the projecting portions of these transparent plates 502a and 502b form the light guide regions A, and the gaps between the side surfaces of these projecting portions form the air layers (low-refractive index layers) 511. Also, the interfaces between the two side surfaces of one air layer 511 and two projecting portions (transparent plates) form the optical interface 510 on one side of one of two adjacent light guide regions A and the optical interface 510 on one side of the other one of the two adjacent light guide regions A. Furthermore, on the rear and front surfaces of the resulting light-condensing member 5, the prisms 6 and the condenser lenses 7 are arranged in a one-to-one correspondence with the light guide regions.

As the adhesive, it is desirable to use an adhesive having a refractive index as close as possible to the refractive index of the first and second transparent plates 502a and 502b. When the refractive indices of the transparent plates 502a and 502b and the adhesive layers are the same or very close, it is possible to obtain the light-condensing member 5 with good light guide characteristics by which almost no light is refracted in the interface between the end face of the projecting portion and the bottom surface of the space.

In this surface light source device, as indicated by the arrows in FIG. 12, the light from the light source 1 enters the light guide plate 3 from its end face and guided in the light guide plate 3. The light emerges from the raised surfaces 4a on the stepped surface of the light guide plate and enters the prisms 6 on the rear surface of the light-condensing member 5.

The light entered in the prisms 6 is refracted and guided to the light guide regions A of the light-condensing member 5 by these prisms 6. The light is refracted and output in a condensing direction by the condenser lenses 7 on the front surface of the light-condensing member 5.

In this device, the light entered in the light guide plate 3 from its end face is guided in the light guide plate 3 while being refracted by the front and rear surfaces, and output with a certain spread from each raised surface 4a on the stepped surface of the light guide plate 3. This light enters the prism 6 on the rear surface of the light-condensing member 5, refracted at an angle meeting the incident angle to the prism 6, and guided to the light guide region A. Therefore, the light propagating toward the surface in each light guide region A of the light-condensing member 5 has a certain spread.

Figure 14:
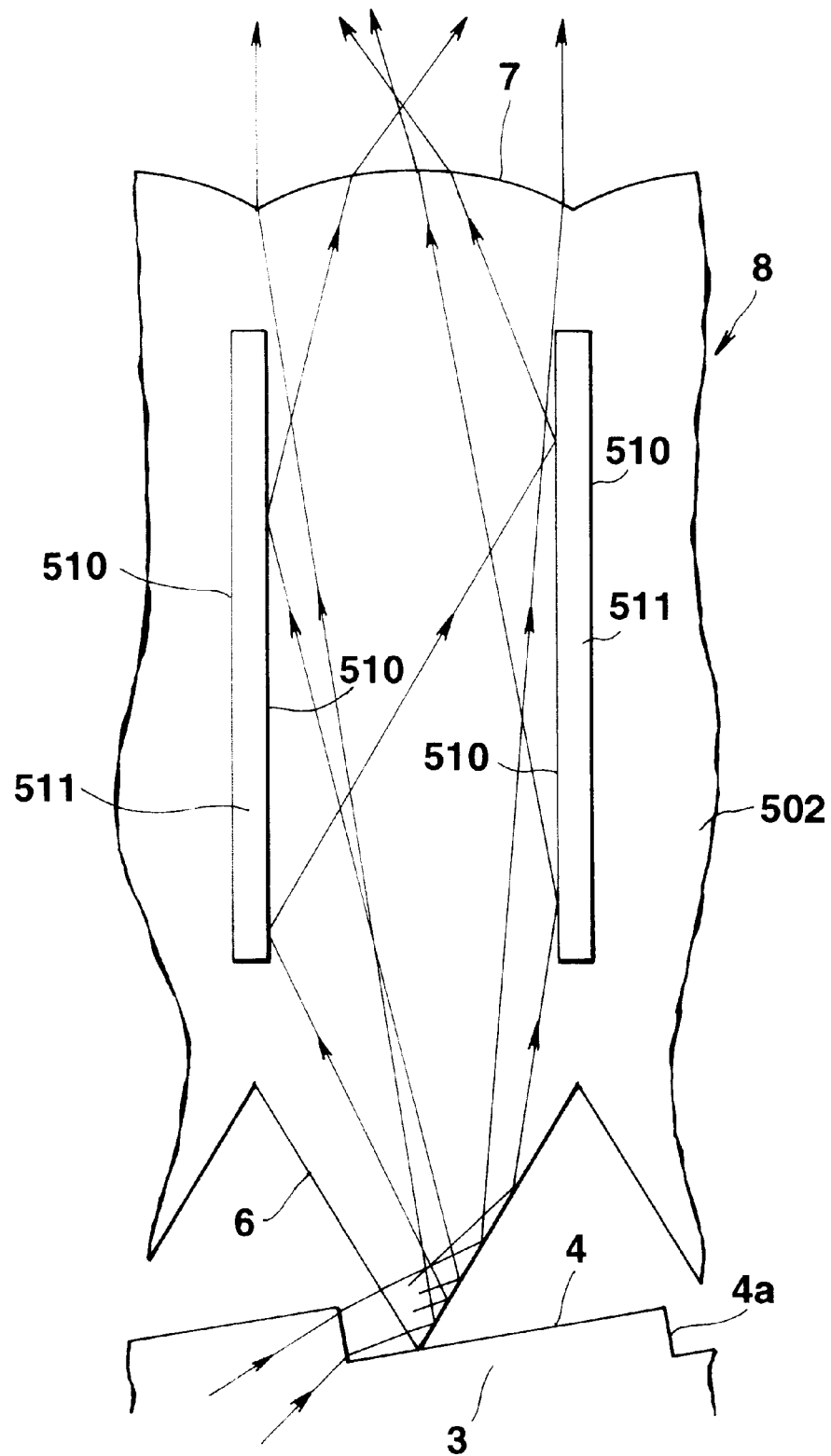
FIG. 14 is an enlarged sectional view showing light exit paths in the surface light source device according to the second embodiment shown in FIG. 12.

FIG. 14 is an enlarged sectional view showing the light exit paths in the above surface light source device, in which hatching of a part of the light-condensing member 5 is omitted. As indicated by the arrows in FIG. 14, components of the light leaving the raised surface 4a on the stepped surface of the light guide plate 3 and entering the prism 6 on the rear surface of the light-condensing member 5 are refracted in directions meeting the positions and angles of incidence to the prism 6. Consequently, the light travels with a certain spread in the light guide region A in the direction of the surface.

Of components of the light guided in the light guide region A in the direction of the surface, light components within a certain spread range travel straight in the light guide region A to the condenser lens 7 corresponding to that light guide region A, and light components outside this certain spread range travel to the outside of the corresponding condenser lens 7. However, these light components propagating to the outside of the condenser lens 7 are reflected or refracted by the optical interfaces on the two sides of the light guide region A. Accordingly, most components of the exit light from the prism 6 can be guided to the condenser lens 7.

As shown in FIG. 14, the light components entering the condenser lens 7 are refracted and output in the condensing direction. Most of light components traveling straight in the light guide region A and entering the condenser lens 7, i.e., light components entering the condenser lens 7 along the direction of divergence centering around the direction along the optical axis of the condenser lens 7, are output in a frontal direction (along the optical axis of the condenser lens 7). On the other hand, most of light components reflected or refracted by the optical interfaces 510 and entering the condenser lens 7, i.e., light components entering the condenser lens 7 in a direction different from the direction of divergence centering around the direction along the optical axis of the lens, are output in directions within a certain range of angles with respect to the frontal direction.

In this surface light source device, therefore, most of the exit light front its surface can be output in the frontal direction and directions within the certain range of angles with respect to the frontal direction without being scattered around. Consequently, the luminance of the exit light within this range can be sufficiently increased.

The optical interface 510 of the light-condensing member 5 is not limited to that of the above embodiment. For example, the optical interfaces 510 can also be formed by forming reflecting films in the boundaries between the light guide regions A. These reflecting films can be formed by forming metal films, by either vapor deposition or plating, on the two side surfaces of each projecting portion of the transparent plates 502*a* and 502*b* in the method of manufacturing the light-condensing member 5 described previously. Alternatively, the reflecting films can be inserted when the light-condensing member 5 is formed by resin molding.

In the above embodiment, the step pitch of the stepped surface of the light guide plate 3 is the same as the pitch of the light guide regions A of the light-condensing member 5. However, the step pitch of the stepped surface of the light guide plate 3 can also be decreased to an integral fraction of the pitch of the light guide regions A of the light-condensing member 5. If this is the case, the exit light components from a plurality of raised surfaces 4*a* on the stepped surface are launched into one prism 6 of the light-condensing member 5.

Third Embodiment

A surface light source device according to the third embodiment of the present invention comprises a light guide plate with a stepped front surface. This light guide plate receives light from one end face and outputs the light from each raised surface on the stepped surface. A light-condensing member is arranged on the front surface of the light guide plate. A plurality of prisms are formed on the rear surface of the light-condensing member to receive the exit light from the raised surfaces on the stepped surface of the light guide plate and refract the light toward the front surface. A plurality of condenser lenses are formed on the front surface of the light-condensing member to refract and output the light from the prisms in a condensing direction. Light from a light source arranged to oppose the incident end face of the light guide plate is guided and output in the direction of the front surface by the light glide plate and the light-condensing member. This sufficiently increases the frontal luminance. Additionally, Fresnel lenses are used as the condenser lenses on the front surface of the light-condensing member. This eliminates the occurrence of moiré fringes caused by a difference between the pitches of the prisms on the rear surface and the condenser lenses on the front surface of the light-condensing member.

The third embodiment of the present invention will be described below with reference to FIGS. 15 to 23. This third embodiment is the same as the first embodiment described earlier except for the construction of the light-condensing member. Therefore, the same reference numerals as in the first embodiment denote the same parts, and a detailed description thereof will be omitted.

Figure 15:
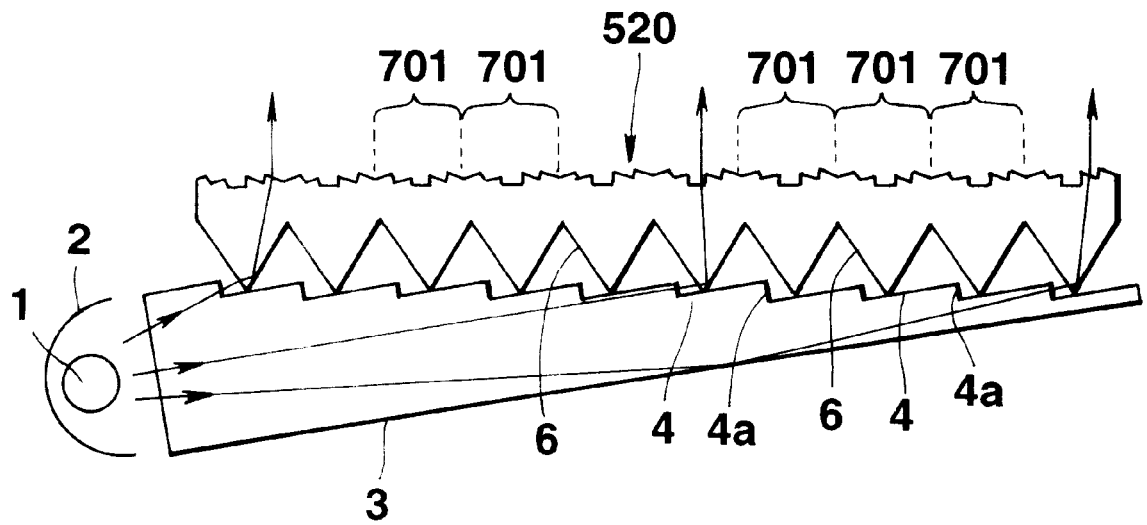
FIG. 15 is a sectional view showing a light source device according to the third embodiment of the present invention.
Figure 16:
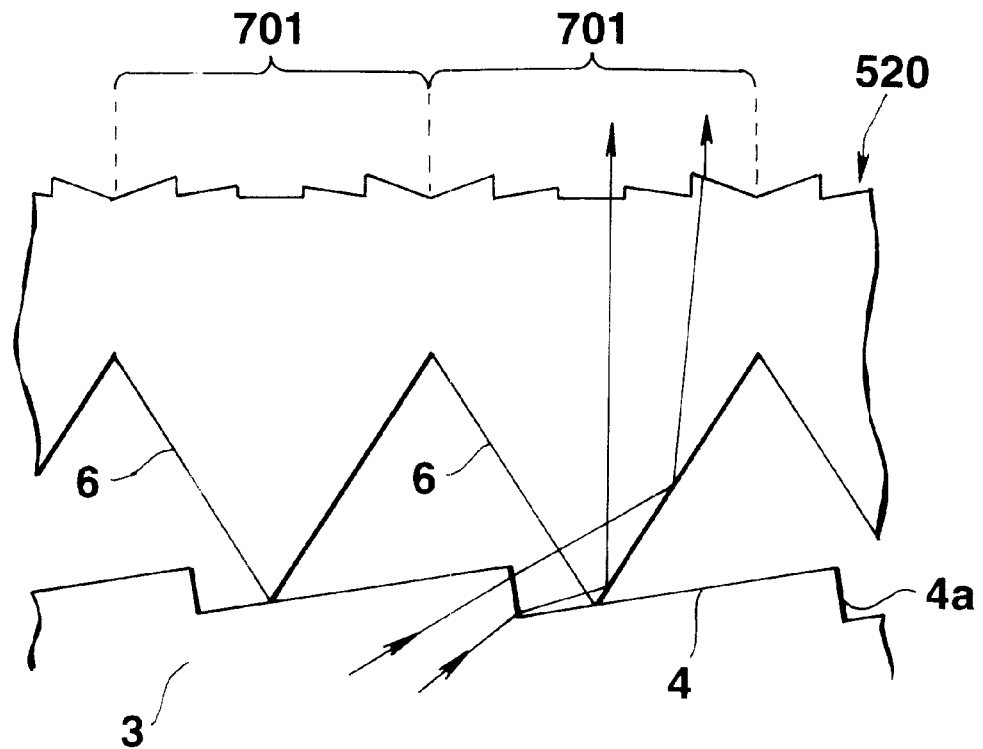
FIG. 16 is a sectional view showing a portion of the light source device shown in FIG. 15 in an enlarged scale.

As shown in FIGS. 15 and 16, this surface light source device comprises a light guide plate 3, a light source 1 arranged on the side of this light guide plate 3 so as to oppose the incident end face of the light guide plate 3, and a light-condensing member 520 arranged on the front surface of the light guide plate 3.

The light guide plate 3 is made of a transparent resin and has a flat rear surface and a stepped front surface which lowers step by step at a predetermined pitch from one end to the other. The step pitch of this stepped front surface is the same as or an integral fraction of the pixel pitch of the liquid crystal display panel shown in FIG. 1.

This light guide plate 3 can be formed by molding using a metal mold or by cutting a transparent plate. In this embodiment, a light guide plate manufactured by a manufacturing method as shown in FIGS. 17A and 17B is used.

Figure 17A:
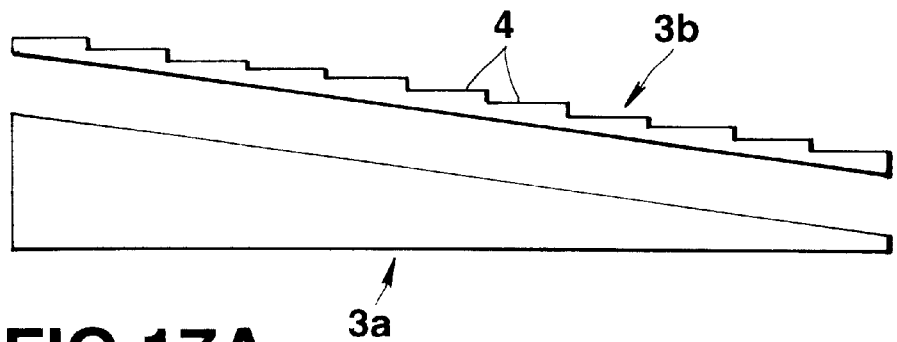
FIGS. 17A and 17B are views illustrating the manufacturing steps of a method of manufacturing a light guide plate used in the light source device shown in FIG. 15.
Figure 17B:
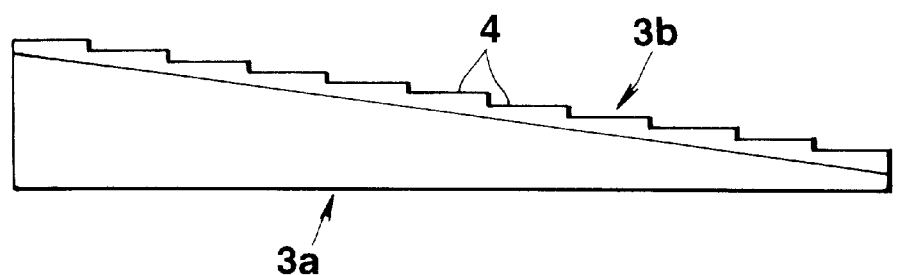

This manufacturing method of the light guide plate 3 is to form a light guide plate main body 3*a* made of a wedge plate and a surface sheet 3*b* having a stepped surface as shown in FIG. 17A and adhere them to manufacture the light guide plate 3 as shown in FIG. 17B.

Figure 18:
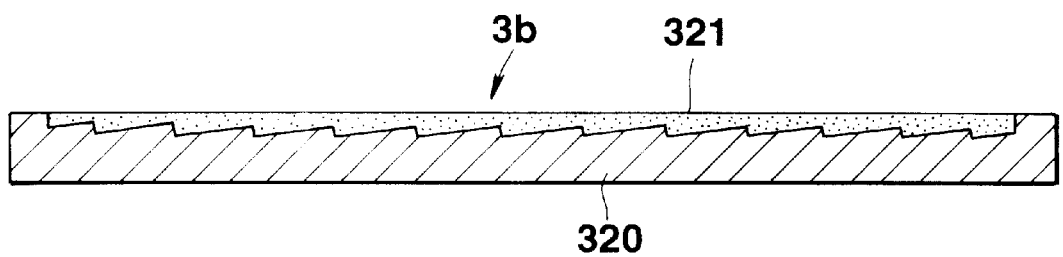
FIG. 18 is a view illustrating a method of forming a surface sheet used in the manufacturing method shown in FIGS. 17A and 17B.

In this manufacturing method, the light guide plate main body 3*a* is molded by using a metal mold and the surface sheet 3*b* is formed as shown in FIG. 18. That is, a template 320 having a recessed portion in its surface is used. On the bottom surface of this recessed portion, a plurality of concaves having an oblong triangular sectional shape corresponding to the shape of each step 4 on the stepped surface to be formed on the front surface of the light guide plate 3 are arranged at the same pitch as the step pitch of the stepped surface. A liquid resin 321 is flowed into the recessed portion of the template 310, and the surface of the resin is smoothened by using, e.g., a squeegee. This resin layer is cured to form the surface sheet 3*b*.

The surface sheet 3*b* manufactured as above has a structure in which a base sheet layer and a stepped layer are integrally formed. The base sheet layer is formed by the resin 321 filled in a region above the concaves on the bottom surface of the recessed portion of the template 320. The stepped layer of the resin 321 entering the concaves is formed on the base sheet layer.

In the manufacture of this surface sheet 3*b*, the bottom surface of the recessed portion of the template 320 is an uneven surface on which the concaves are arranged at a fine pitch. However, since the whole recessed portion is open upward, an enough amount of the resin 321 can be flowed into this recessed portion, and this resin 321 flows on the uneven surface and spreads over the entire recessed portion. Accordingly, it is possible by curing this resin layer to obtain the surface sheet 3*b* having the stepped surface with a high shape accuracy free of defects such as rounding and chipping of corners.

The surface sheet 3*b* manufactured by the above method has the integrally formed base sheet layer and stepped layer.

Figure 19:
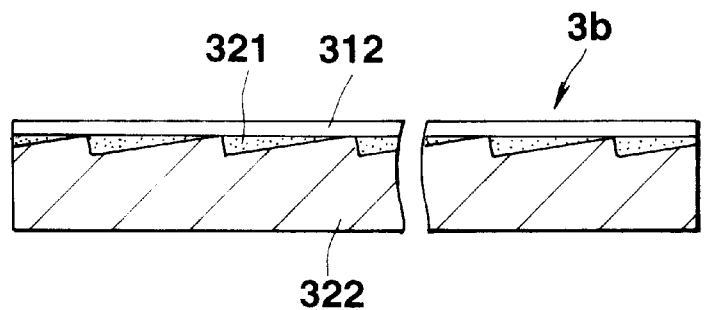
FIG. 19 is a view illustrating another method of forming the surface sheet manufactured by the manufacturing method in FIGS. 17A and 17B.

The surface sheet 3b can also be formed by a method as shown in FIG. 19. That is, a template 322 on the surface of which concaves having an oblong triangular sectional shape are arranged is used. A resin 321 is flowed into these concaves, and the surface of the resin is so smoothened as to be level with the opening of each concave. A base film 312 made from a transparent resin film is stacked on the surface of this resin layer, and the resin layer is cured to form the surface sheet 3b.

The light guide plate 3 can be manufactured by stacking the light guide plate main body 3a and the surface sheet 3b as shown in FIG. 17B and adhering the whole opposing surfaces by using a transparent adhesive (not shown). By this manufacturing method, a light guide plate with a high shape accuracy can be manufactured at a high yield and a low cost.

As shown in FIGS. 15 and 16, a plurality of prisms 6 are arranged on the rear surface and a plurality of condenser lenses 701 are arranged on the front surface of the light-condensing member 520. The prisms 6 receive the exit light from raised surfaces 4a on the stepped surface of the light guide plate 3 and refract the light in the direction of the front surface. The condenser lenses 701 refract and output the light from the prisms 6 in a condensing direction.

Each prism 6 is an oblong prism with an inverse triangular sectional shape formed along the widthwise direction of the stepped surface of the light guide plate 3. These prisms 6 are arranged parallel to each other at the same pitch as the step pitch of the stepped surface of the light guide plate 3.

Each condenser lens 701 is an oblong lens formed along the longitudinal direction of the prism 6. These condenser lenses 701 are formed parallel to each other at the same pitch as the array pitch of the prisms 6.

In this embodiment, the width of the prism 6 is the same as the width of the step 4 on the stepped surface of the light guide plate 3. Also, the width of the condenser lens 701 is the same as the prism 6. Accordingly, the width of the prism 6 and the condenser lens 701 is the same as or an integral fraction of the pixel width of a liquid crystal panel.

The condenser lens 701 is a linear Fresnel lens consisting of an odd number, three or more thin lens surfaces (in this embodiment, five lens surfaces). The optical axis of the condenser lens 701 is parallel to a perpendicular dropped on the light-condensing member 520.

The light-condensing member 520 can be either a molded product using a metal mold or a cut product of a transparent plate. In this embodiment, a light-condensing member manufactured by a manufacturing method as shown in FIGS. 20A and 20B is used.

Figure 20A:
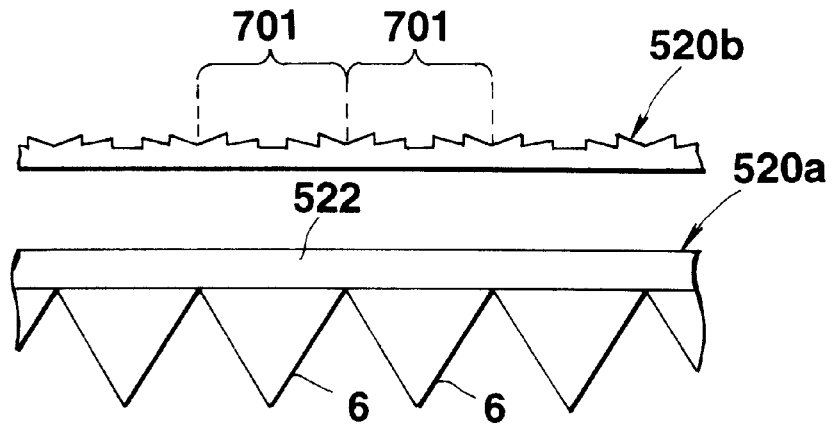
FIGS. 20A and 20B are views illustrating the manufacturing steps of a method of manufacturing a light-condensing member used in the light source device shown in FIG. 15.
Figure 20B:
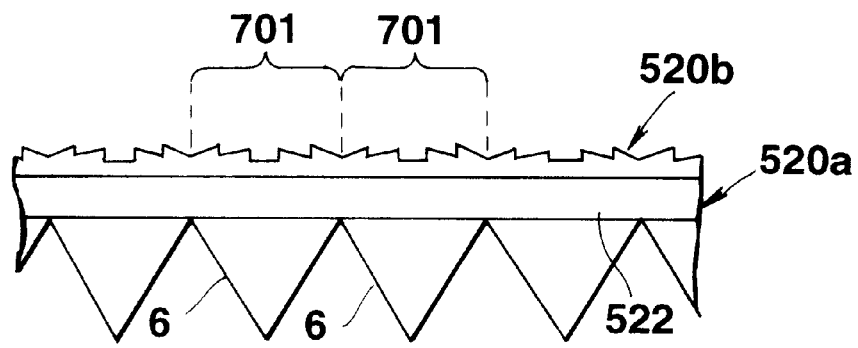

This manufacturing method of the light-condensing member 520 is to form a prism sheet 520a and a lens sheet 520b as shown in FIG. 20A and adhere them to manufacture the light-condensing member 520 as shown in FIG. 20B.

Figure 21:
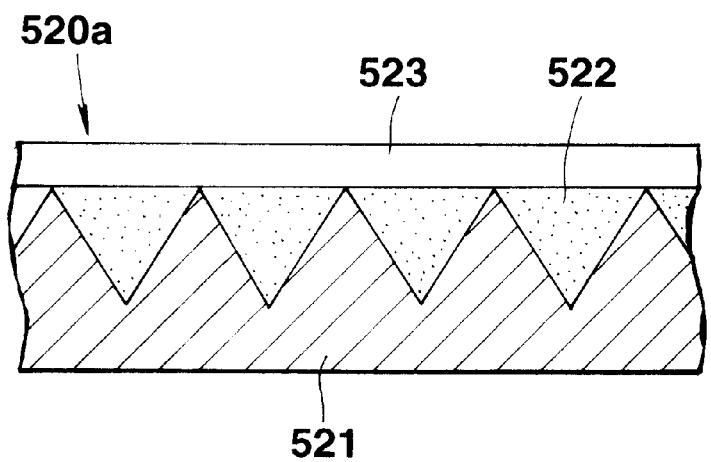
FIG. 21 is a view illustrating a method of forming a prism sheet manufactured by the manufacturing method shown in FIGS. 20A and 20B.

In this manufacturing method, the prism sheet 520a is formed as shown in FIG. 21. That is, a template 521 on the surface of which a plurality of concaves are formed is used. These concaves have an inverse triangular sectional shape corresponding to the shape of the prisms 6 to be formed on the rear surface of the light-condensing member 520 and are arranged at the same pitch as the array pitch of the prisms 6. A liquid resin 522 is flowed into these concaves of the template 521, and the surface of the resin is so smoothened as to be flush with the opening of each concave by using, e.g., a squeegee (not shown). A base film 523 made of a transparent resin film is stacked on the surface of the resin layer, and the resin layer is cured to manufacture the prism sheet 520a.

Although not shown, the lens sheet 502b is manufactured by a method similar to the method of manufacturing the surface sheet 3b of the light guide plate 3 shown in FIG. 18 or 19. That is, a template having a recessed portion in its surface is used. Concaves having a sectional shape corresponding to the shape of Fresnel lenses (linear Fresnel lenses) 701 to be formed on the surface of the light-condensing member 520 are arranged on the bottom surface of the recessed portion. A base sheet layer is formed by a resin filled in a region above the concaves on the bottom surface of the recessed portion. The Fresnel lenses 701 made of a resin entering the concaves are integrally formed on the base sheet layer to obtain the lens sheet. Alternatively, a template on the surface of which concaves are formed is used. The Fresnel lenses 701 made of a resin entering the concaves of the template are arranged and integrally stacked on the base film to obtain the lens sheet.

The light-condensing member 520 can be manufactured by stacking the prism sheet 520a and the lens sheet 520b as shown in FIG. 20B and adhere the whole opposing surfaces by using a transparent adhesive (not shown). By this manufacturing method, the light-condensing member 520 with a high shape accuracy can be manufactured at a high yield and a low cost.

As indicated by the arrows in FIG. 15, the light coming from the light source 1 enters the light guide plate 3 from its end face and guided in the light guide plate 3. The light emerges from the raised surfaces 4a on the stepped front surface of the light guide plate and enters the prisms 6 on the rear surface of the light-condensing member 520.

As indicated by the arrows in FIG. 16, the light entering the prisms 6 is refracted by these prisms 6 and guided in the light-condensing member 520 toward the front surface. The light is refracted and output in a condensing direction by the condenser lenses 701 on the front surface of the light-condensing member 520.

In this surface light source device, therefore, most of the exit light from the surface can be output in a frontal direction without being scattered around. Consequently, a sufficiently high frontal luminance can be obtained.

Additionally, in this embodiment each condenser lens 701 on the front surface of the light-condensing member 520 is a Fresnel lens. Therefore, although the prisms 6 are arranged on the rear surface and the condenser lenses 701 are arranged on the front surface of the light-condensing member 520, no moiré fringes are formed by a relative pitch difference between the prisms 6 and the condenser lenses 701.

That is, to simplify the light guide plate and the light-condensing member, in FIG. 15 the stepped surface of the light guide plate and the prisms and the condenser lenses of the light-condensing member are shown in an enlarged scale. Since, however, the surface light source device of this embodiment is used as a backlight of a liquid crystal display device, the step pitch of the stepped surface of the light guide plate 3 and the array pitch of the prisms 6 and the condenser lenses 701 of the light-condensing member 520 are the same as or an integral fraction of the pixel pitch of a liquid crystal display panel. Accordingly, the width of the step 4 on the stepped surface of the light guide plate 3 and the width of the prism 6 and the condenser lens 701 of the light-condensing member 520 are very small.

The light-condensing member 520 is so designed that the array pitch of the prisms 6 formed on the rear surface and the array pitch of the condenser lenses 701 formed on the front surface are equal. However, since the width of the prism 6 and the condenser lens 701 is very small, it is difficult to form these prisms and lenses at the same pitch.

Consequently, moiréfringes are formed by an array pitch difference between the prisms 6 and the condenser lenses 701. In the surface light source device of this embodiment, however, each condenser lens 701 is a Fresnel lens. Therefore, compared to a case wherein the condenser lenses 701 are the convex lenses described earlier, the array pitch of the lenses on the front surface of the light-condensing member 520 is apparently a fraction of the number of lens surfaces of the Fresnel lens (⅕ in the case of the Fresnel lens consisting of five lens surfaces as shown in FIGS. 15 and 16).

Accordingly, in this surface light source device, no moiré fringes are visually observed because the pitch difference between the prisms 6 on the rear surface and the condenser lenses 701 on the front surface of the light-condensing member 520 is large.

Figure 22:
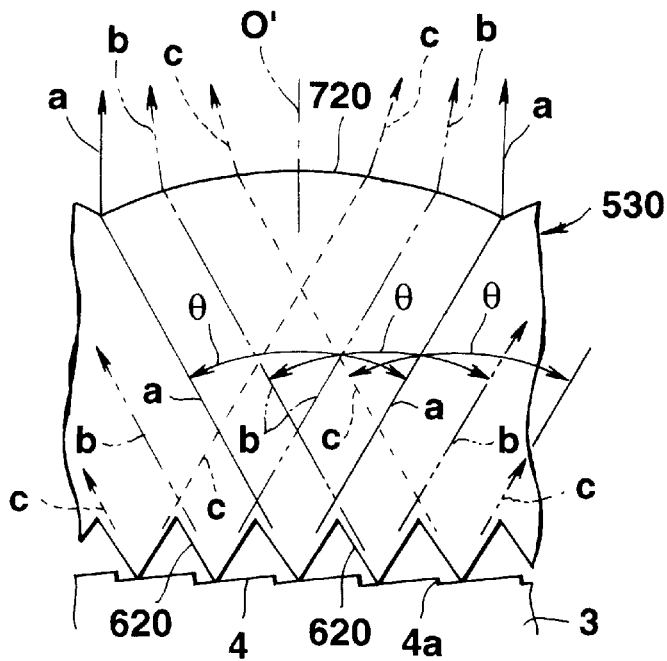
FIG. 22 is a sectional view showing the first modification of the third embodiment.

FIG. 22 shows a portion of a surface light source device of the first modification according to the third embodiment of the present invention.

In this surface light source device, prisms 620 are formed on the rear surface of a light-condensing member 530 at a pitch smaller than the array pitch of condenser lenses 720 formed on the front surface of the light-condensing member 530. An odd number, at least three prisms (five prisms in FIG. 22) are opposed to one condenser lens 720. Each condenser lens 720 is a convex lens (cylindrical lens) having a continuous curved surface over the entire width.

The step pitch of the stepped surface of a light guide plate 3 used in this modification is the same as the array pitch of the prisms 620 of the light-condensing member 530. The light-condensing member 530 is arranged on the surface of the light guide plate 3 such that the apex of each prism 620 on the rear surface of the light-condensing member 530 is brought into contact with the surface of a corresponding step 4 on the stepped surface of the light guide plate 3, and one side surface of each prism 620 is closely opposed to a corresponding raised surface 4a on the stepped surface of the light guide plate 3.

In this surface light source device, the array pitch of the prisms 620 on the rear surface of the light-condensing member 530 is made smaller than the pitch of the condenser lenses 720 on the front surface, and so an odd number, at least three prisms 620 are opposed to one condenser lens 720. Consequently, of light components incident on one condenser lens 720 from the prisms 620 opposing this condenser lens 720, most light components from the prism 620 in the center are output in a frontal direction along an optical axis 0' of the condenser lens. Most light components from the prisms on the two sides are output in directions inclined to some extent to the optical axis 0' of the condenser lens.

That is, in FIG. 22, arrows a, b, and c schematically indicate light components entering one condenser lens 720 from the prisms 620 opposing this condenser lens 720. These prisms 620 have the same shape, and the incident conditions of light components from the raised surfaces 4a of the light guide plate 3 to these prisms 620 are nearly the same. Therefore, the light components a from the central prism 620, the light components b from the prisms 620 on the two sides of the central prism 620, and the light components c from the outermost prisms 620 are light components having substantially the same spreading angle θ centering around a direction almost parallel to the optical axis 0' of the condenser lens 720. These light components are refracted by the condenser lens 720 and output in an almost frontal direction with a predetermined spread.

Accordingly, in the surface light source device of this modification, most exit light from the surface can be output in directions, including the frontal direction, within a predetermined range of angles without being scattered around. Consequently, it is possible to increase not only the frontal luminance but also the luminance when the surface is observed in a direction inclined to some extent to the frontal direction. It is also possible to make the luminance distribution almost uniform.

This surface light source device is therefore suitable as a backlight of a liquid crystal display device. When this surface light source device is used as a backlight, a liquid crystal display device can be made well display images with a high frontal luminance and a wide viewing angle.

Additionally, in this modification, the prisms 620 on the rear surface of the light-condensing member 530 are arranged at a pitch smaller than the array pitch of the condenser lenses 720 on the front surface of the light-condensing member 530, and each condenser lens 720 is a convex lens having a continuous curved surface throughout the width. Therefore, since the array pitches of the prisms 620 and the condenser lenses 720 are largely different, no moiré fringes are produced by a pitch difference between the prisms 620 and the condenser lenses 720.

Figure 23:
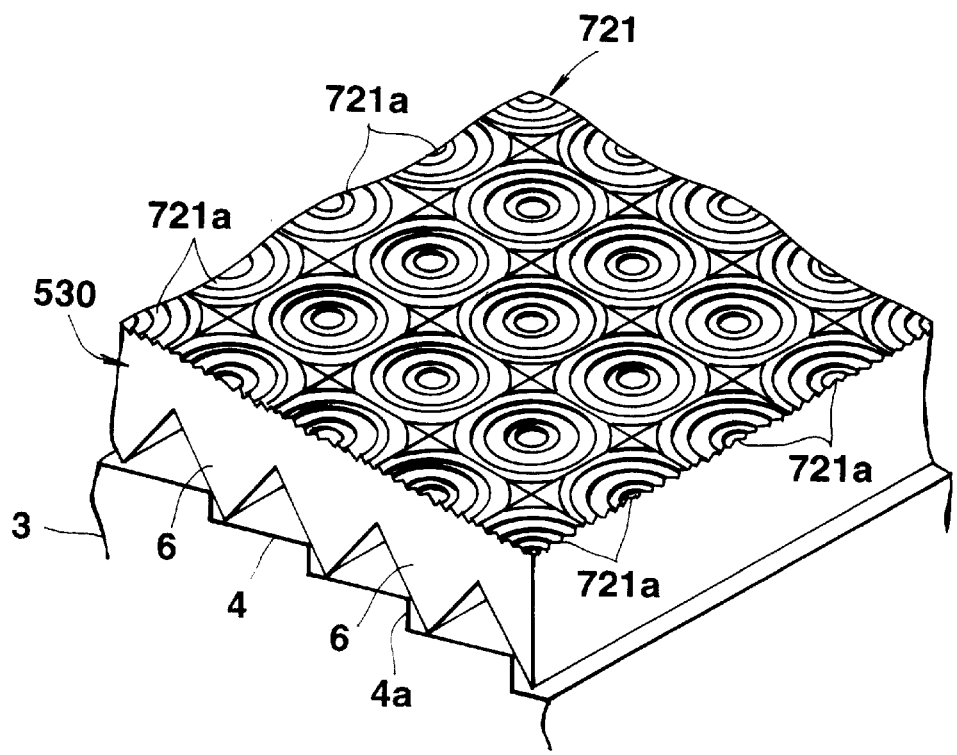
FIG. 23 is a sectional view showing the second modification of the third embodiment.

FIG. 23 shows the second modification of the third embodiment of the present invention.

In this surface light source device, condenser lenses 721a are arranged on the surface of a light-condensing member 530 in both the longitudinal and lateral directions of a light guide plate 3, thereby forming lens arrays 721.

Each lens 721a of each lens array (condenser lens unit) 721 is a circular Fresnel lens.

The array pitch of prisms 6 of the light-condensing member 530 and the step pitch of the stepped surface of the light guide plate 3 are the same as in the first embodiment described previously. The light-condensing member 530 is arranged on the surface of the light guide plate 3 such that the apex of each prism 620 on the rear surface of the light-condensing member 530 is brought into contact with the surface of a corresponding step 4 on the stepped surface of the light guide plate 3, and one side surface of each prism 620 is closely opposed to a corresponding raised surface 4a on the stepped surface of the light guide plate 3.

In this modification, the lens array in which the condenser lenses 721a are arranged in the longitudinal direction of the prism 6 opposes the prism 6. Therefore, the light entering the condenser lenses 721a from the prism 6 can be refracted and output in a condensing direction not only in the widthwise direction of this condenser lens array 721 but also in the longitudinal direction of the condenser lens array 721. Consequently, the frontal luminance can be further increased.

Also, in this modification, each condenser lens array 721 is formed by arranging the lenses 721a in the longitudinal direction of the prism 6, and each lens 721a is a circular Fresnel lens. Accordingly, as in the third embodiment, no moiré fringes are formed by a pitch difference between the prisms 6 on the rear surface and the condenser lens units 721 on the front surface of the light-condensing member 530.

Fourth Embodiment

The fourth embodiment of the present invention will be described below. A surface light source device of this fourth embodiment comprises a plurality of prisms and a plurality of condenser lenses. These prisms refract light guided from a light source and emerging from a light guide plate in a direction in which the angle with respect to a normal to the light guide plate decreases. The condenser lenses condense the exit light from the prisms in a predetermined direction. On the surface of the light guide plate, a plurality of projections each having raised surfaces for outputting the light guided in the light guide plate are formed in a one-to-one correspondence with spaces between the prisms of a light-condensing member.

In this arrangement, components of the light guided in the light guide plate emerge from the raised surfaces of the projections and nearly uniformly enter the prisms of the light-condensing member. Consequently, the luminance distribution of the exit light can be made uniform.

The fourth embodiment of the present invention will be described below with reference to FIGS. 24 to 32. This fourth embodiment is the same as the first embodiment except for the construction of the light guide plate. Therefore, the same reference numerals as in the first embodiment denote the same parts, and a detailed description thereof will be omitted.

Figure 24:
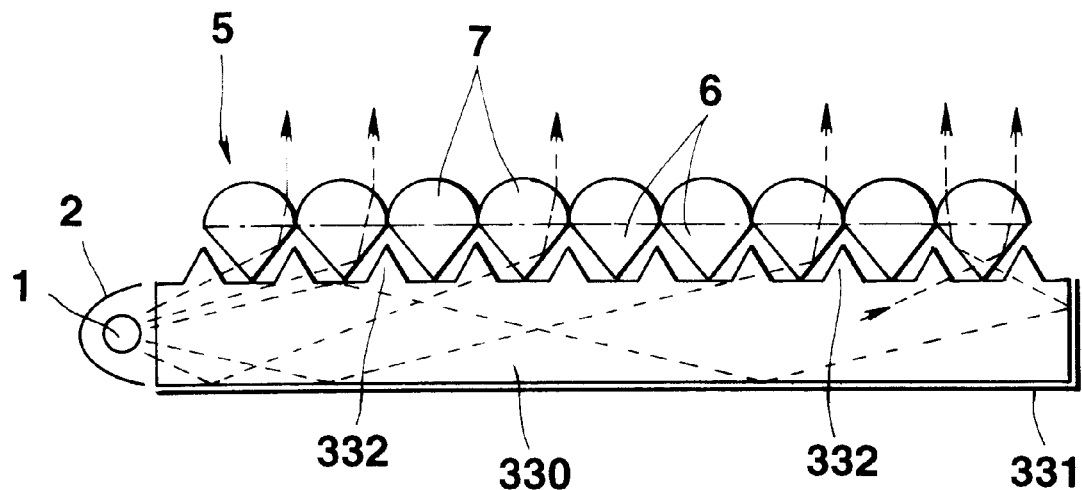
FIG. 24 is a sectional view showing a surface light source device according to the fourth embodiment.

In FIG. 24, this surface light source device forms a surface light source by guiding the light from a light source 1 by a light guide plate. The surface light source device comprises a light guide plate 330 for receiving light from its one end face and outputting the light toward the front surface, and a light-condensing member 5 for condensing the exit light from the light guide plate 330 in a predetermined direction.

The light guide plate 330 is a transparent plate made from, e.g., an acrylic resin and having parallel front and rear surfaces. A reflecting film 331 is formed on the rear surface and the circumferential surfaces except for the end face for receiving light of the light guide plate 330. A plurality of projections 332 each having raised surfaces for emitting light guided in the light guide plate 330 are integrally formed on the front surface of the light guide plate 330.

Each projection 332 is a linear prism formed along the widthwise direction of the light guide plate 330. Raised surfaces (inclined surfaces) on the two sides of the projection 332 are exit surfaces. These projections (linear prisms) 332 are arranged at predetermined intervals in the light guide direction of the light guide plate 330.

The light-condensing member 5 comprises a plurality of prisms 6 for refracting the exit light from the light guide plate 330 in a direction in which the angle with respect to a normal to the light guide plate 330 decreases, and a plurality of condenser lenses 7 arranged on the exit side of the prisms 6.

Each prism 6 is a linear prism having an inverse triangular sectional shape. These prisms 6 are continuously formed parallel to each other in the widthwise direction. Each condenser lens 7 is a linear lens with a nearly semicircular section having substantially the same width as the width of the prism 6. These lenses 7 are formed parallel to each other in a one-to-one correspondence with the prisms 6.

Figure 25:
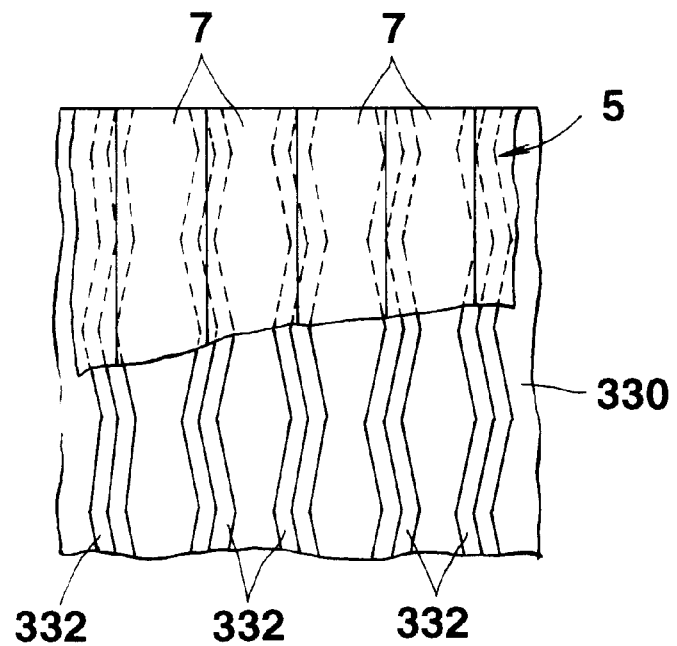
FIG. 25 is a plan view showing a portion of the light source device shown in FIG. 24 in an enlarged scale.

This light-condensing member 5 is arranged on the front surface side of the light guide plate 330 such that the longitudinal direction of the prisms 6 and the lenses 7 is consistent with the widthwise direction of the light guide plate 330. The tip of each prism 6 is brought into contact with or positioned close to the surface of the light guide plate 330. Each projection (linear prism) 332 formed on the surface of the light guide plate 330 is positioned in a space between the corresponding prisms 6 of the light-condensing member 5. In this embodiment, as shown in FIG. 25, these projections 332 form a zigzag pattern along their longitudinal direction.

The paths of light from the light source 1 are indicated by the broken lines in FIGS. 24 and 26. As shown in FIGS. 24 and 26, the light from the light source 1 enters the light guide plate 330 from its end face, guided in the light guide plate 330, and emerges from its front surface. The exit light is refracted by the prisms 6 of the light-condensing member 5 in a direction in which the angle with respect to a normal to the light guide plate 330 decreases. The refracted light is output through the condenser lenses 7 provided on the exit side of the prisms 6.

In this structure, the light entering the light guide plate 330 is guided in the light guide plate 330 toward the other end while being alternately reflected by flat portions between the projections 332 on the front surface of the light guide plate and the rear surface of the light guide plate. The light reaching the other end of the light guide plate 330 returns in the light guide plate 330 while being similarly, alternately reflected by the front and rear surfaces of the light guide plate. This increases the luminance of light in the light guide plate 330 over the whole area of the light guide plate 330.

In this embodiment, the projections (linear prisms) 332 are formed on the front surface of the light guide plate 330 in a one-to-one correspondence with the spaces between the prisms 6 of the light-condensing member 5. Therefore, of the light guided in the light guide plate 330 while being reflected by the front and rear surfaces of the light guide plate, light directed toward the projections 332 on the front surface of the light guide plate emerges from the raised surfaces (inclined surfaces) of the projections 332 and enters the prisms 6 of the light-condensing member 5.

In this embodiment, the projections 332 having raised surfaces for outputting the light guided in the light guide plate 330 are formed on the front surface of the light guide plate 330 in a one-to-one correspondence with the spaces between the prisms 6 of the light-condensing member 5. Accordingly, components of the light guided in the light guide plate 330 emerge from the raised surfaces of the projections 332 and nearly uniformly enter the prisms 6 of the light-condensing member 5. Consequently, the luminance distribution of the exit light can be made uniform.

In this construction, if the projections 332 on the front surface of the light guide plate are parallel to the prisms 6 and the condenser lenses 7 of the light-condensing member 5, linear shadows along the projections 332 are formed in the surface light source formed by the light emitted through the light-condensing member 5. However, as shown in FIG. 25, these projections 332 form a zigzag pattern along their longitudinal direction. Therefore, light components emerging from the raised surfaces in individual regions along the longitudinal direction of the projections 332 are refracted and condensed in directions shifted from each other by the prisms 6 and the condenser lenses 7 of the light-condensing member 5. This almost eliminates the occurrence of the shadows, so it is possible to obtain a surface light source with a uniform luminance distribution.

In this embodiment, the concave portions 332 on the surface of the light guide plate are linear prisms formed along the widthwise direction of the light guide plate 330. However, as shown in FIGS. 27A and 27B, it is also possible to use pyramidal prisms 332a whose bottom sides cross the widthwise direction of the light guide plate 330 at an angle of nearly 450. If this is the case, it is only necessary to arrange a plurality of pyramidal prisms 332a in the widthwise direction of the light guide plate 330 for each of the spaces between the prisms 6 of the light-condensing member 5.

The array patterns of these pyramidal prisms 332a are as follows. As shown in FIG. 27A, the pyramidal prisms 332a in individual rows corresponding to the spaces between the prisms 6 of the light-condensing member 5 are formed at the same pitch. Alternatively, as shown in FIG. 27B, the pyramidal prisms 332*a* in individual rows are shifted nearly a ½ pitch from each other. With the latter array pattern, a surface light source with a more uniform luminance distribution can be obtained.

In the above embodiment, the condenser lenses 7 of the light-condensing member 5 are convex lenses having an almost semicircular section. However, these condenser lenses 7 can also be Fresnel lenses. When Fresnel lenses are used as the condenser lenses 7, the valleys between the adjacent condenser lenses 7 become shallow to make their shadows almost inconspicuous. This makes the luminance distribution more uniform.

Figure 28:
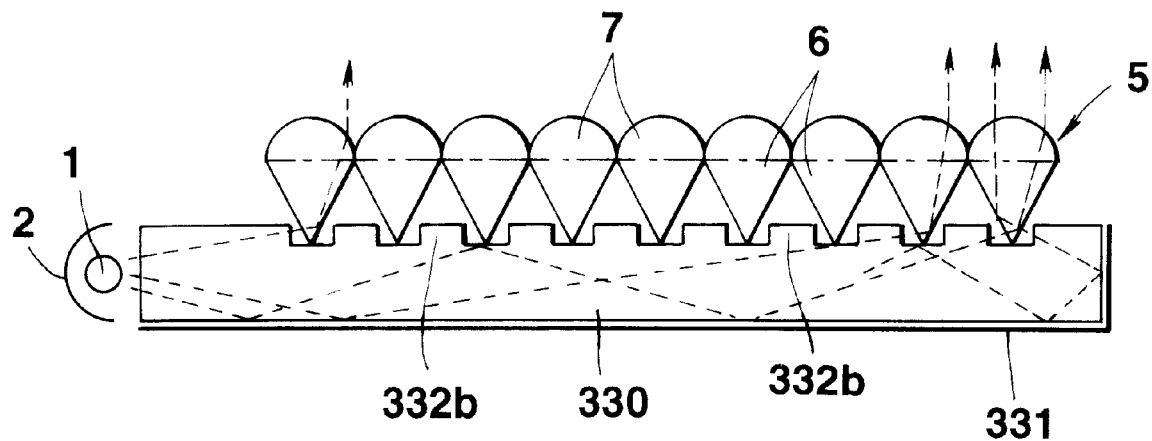
FIG. 28 is a sectional view showing the third modification of the fourth embodiment.
Figure 29:
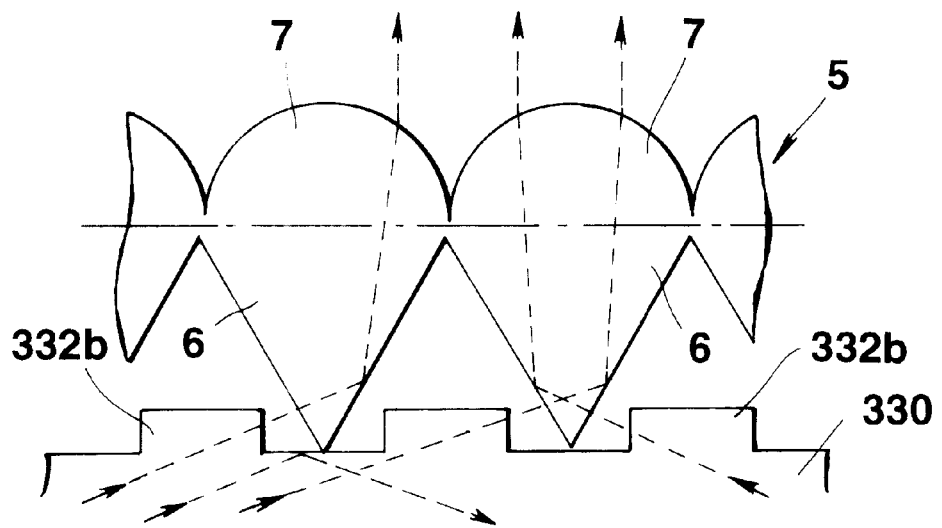
FIG. 29 is a sectional view showing a portion of the light source device shown in FIG. 28 in an enlarged scale.

FIGS. 28 and 29 show the third modification according to the fourth embodiment of the present invention. FIG. 28 is a sectional view of a light source device, and FIG. 29 is an enlarged view of a part of FIG. 28.

In this light source device, projections 332*b* having a rectangular sectional shape are formed in a one-to-one correspondence with spaces between prisms 6 of a light-condensing member 5. Light guided in a light guide plate 330 is output from raised surfaces (vertical surfaces) on the two sides of each projection 332*b*. In this modification, these projections 332*b* are formed by cutting portions of the surface of the light guide plate 330 to which the tips of the prisms 6 oppose.

In this light source device, the projections 332*b* having raised surfaces for outputting light guided in the light guide plate 330 are formed in a one-to-one correspondence with the spaces between the prisms 6 of the light-condensing member 5. Therefore, components of the light guided in the light guide plate 330 emerge from the raised surfaces of the projections 332*b* and nearly uniformly enter the prisms 6 of the light-condensing member 5. Consequently, the luminance distribution of the exit light can be made uniform.

Figure 30:
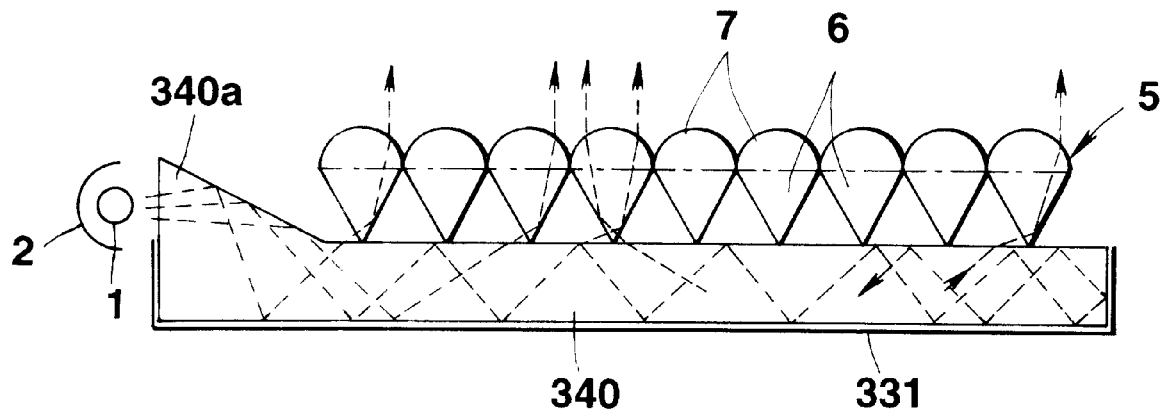
FIG. 30 is a sectional view showing the fourth modification of the fourth embodiment.
Figure 31:
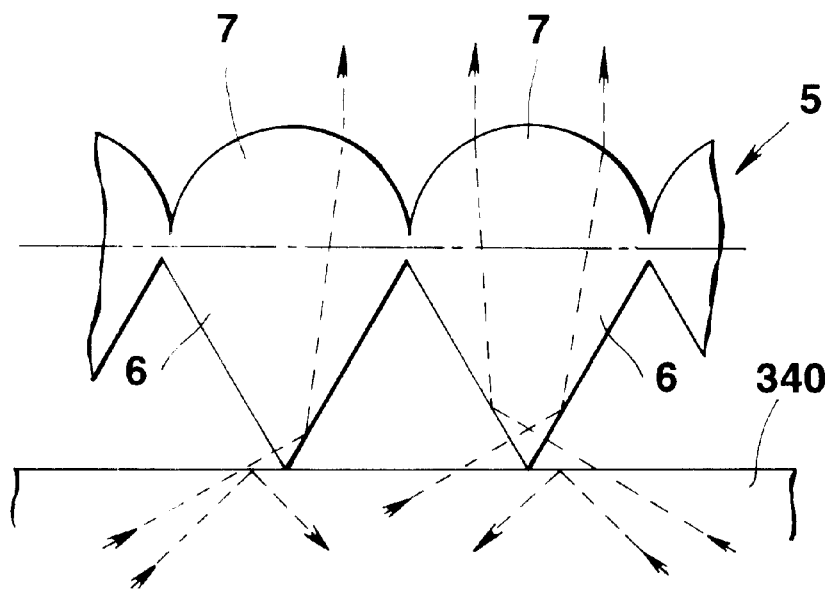
FIG. 31 is a sectional view showing a portion of the light source device shown in FIG. 30 in an enlarged scale.

FIGS. 30 and 31 show the fourth modification according to the fourth embodiment of the present invention.

In this light source device, a light guide plate 340 constituting a light guide means for guiding the light from a light source 1 is a flat plate having parallel front and rear surfaces and includes a prism 340*a*. This prism 340*a* is formed on the surface of one end portion of the light guide plate 340 and refracts incident light from the end face toward the rear surface of the light guide plate at angles at which the average incident angle to the rear surface is the total reflection angle.

The light guide plate 340 with this construction is called a Lummer-Gehrcke plate. A reflecting film 331 is formed on the rear surface and the circumferential surfaces of the light guide plate 340 except for the end face (incident surface) of the prism 340*a*. The light source 1 is arranged to oppose the end face of the prism 340*a*.

In this light source device, as in the device of the first embodiment, light entering the light guide plate 340 from its end face is guided in the light guide plate 340 and emerges from its front surface. The exit light is refracted in a direction in which the angle with respect to a normal to the light guide plate 340 decreases by a plurality of prisms 6 of a light-condensing member 5. The refracted light is condensed in a predetermined direction by a plurality of condenser lenses 7 arranged on the exit side of the prisms 6. When this light source device is used, it is possible to sufficiently increase the frontal luminance of the surface light source and also increase the utilization ratio of the light from the light source 1.

In this modification, a Lummer-Gehrcke plate having the prism 340*a* is used as the light guide plate 340. This prism 340*a* is formed on the surface of one end portion of the light guide plate 340 and refracts incident light from the end face toward the rear surface of the light guide plate in directions in which the average incident angle to the rear surface is the total reflection angle. The light source 1 is arranged to oppose the end face of the prism 340*a*. Therefore, the light entering the light guide plate 340 from the light source 1 makes a round-trip in the light guide plate 340 while being repetitively refracted by the front and rear surfaces of the light guide plate 340.

In this light source device, therefore, the luminance of light in the light guide plate 340 is increased over the whole area of the light guide plate. Of components of that light, those incident on the front surface of the light guide plate at angles at which they are transmitted through that surface emerge from the front surface of the light guide plate 340. Accordingly, exit light with a higher luminance can be obtained. Additionally, it is possible to allow the light components guided in the light guide plate 340 to nearly uniformly enter the prisms 6 of the light-condensing member 5. Consequently, the luminance distribution of the incident light can be made uniform.

Figure 32:
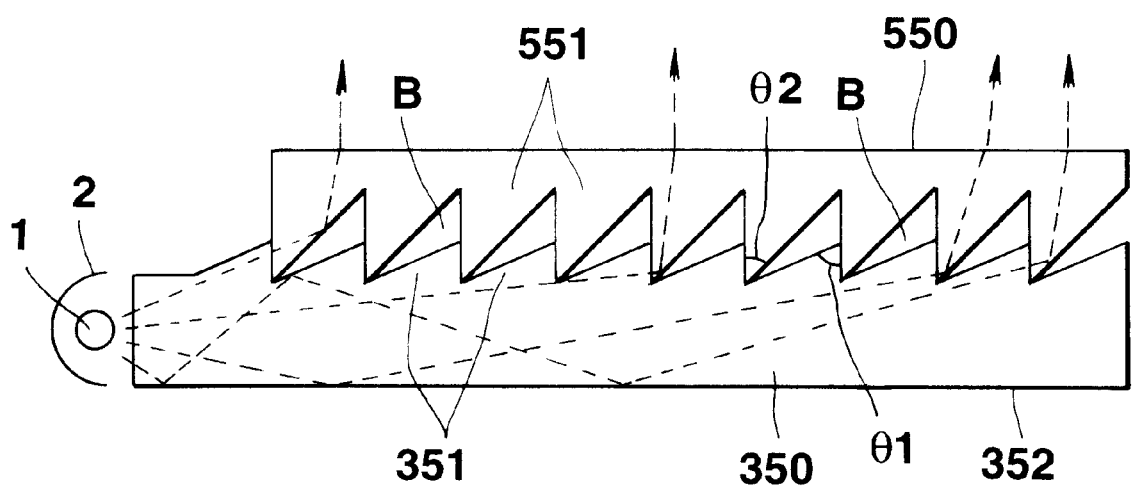
FIG. 32 is a sectional view showing the fifth modification of the fourth embodiment.

FIG. 32 shows the fifth modification according to the fourth embodiment of the present invention.

In a light source device of this modification, a plurality of linear prisms 351 are continuously formed parallel to each other in the widthwise direction on the surface of a light guide plate 350. A reflecting film 352 is formed on the rear surface and the circumferential surfaces of the light guide plate 350 except for the end face for receiving light. Each prism 351 is a prism with a right-angled triangular sectional shape having an inclined surface on the side of the incident end face and a vertical surface on the other side.

Also, a light-condensing member 550 has a structure in which a plurality of linear prisms 551 are formed on the rear surface of a transparent plate in the widthwise direction of the transparent plate in a one-to-one correspondence with the prisms 351 on the front surface of the light guide plate 350. Each prism 551 is a prism with a right-angled triangular sectional shape having a vertical surface on the side of the incident end face of the light guide plate 350 and an inclined surface on the other side.

The light-condensing member 550 is arranged on the front surface side of the light guide plate 350 such that the vertical surfaces of the prisms 551 on the rear surface of the light guide member 550 are brought into tight contact with the vertical surfaces of the prisms 351 on the front surface of the light guide plate 350. A light source 1 is arranged to oppose the incident end face of the light guide plate 350.

Note that an apical angle (the inclination angle of the inclined surface to the vertical surface) θ1 of each prism 351 on the front surface of the light guide plate 350 and an apical angle θ2 of each prism 551 on the rear surface of the light-condensing member 550 have a relation of θ1>θ2 Accordingly, the inclined surfaces of the prisms 351 of the light guide plate 350 and the inclined surfaces of the prisms 551 of the light-condensing member 550 oppose each other with triangular spaces B between them.

In the light source device of this modification, light entering the light guide plate 350 from its end face is guided in the light guide plate 350 while being alternately reflected by the rear surface of the light guide plate 350 and the inclined surfaces of the prisms 351 on the front surface of the light guide plate. The light emerges from the vertical surfaces of the prisms 351 and enters the light-condensing member 550. The incident light is refracted in a direction in which the angle with respect to a normal to the light guide plate 350 decreases by the prisms 551 on the rear surface of the light-condensing member 550 and emerges from the front surface of the light-condensing member 550.

That is, in this light source device, the light entering the light guide plate 350 from its end face, guided in the light guide plate 350, and entering from the front surface is refracted in a direction in which the angle with respect to a normal to the light guide plate 350 decreases by the prisms 551 constituting the light-condensing member 550. In this light source device, therefore, it is possible to sufficiently increase the frontal luminance of the surface light source formed by the exit light from the light guide means consisting of the light guide plate 350 and the light-condensing member 550. It is also possible to increase the utilization ratio of the light from the light source.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A surface light source device comprising:
   a light source;
   a light guide plate, formed from one block of an optically homogeneous transparent material, at one end of which said light source is arranged and which has a stepped surface whose thickness decreases step by step at a predetermined pitch from the one end to the other, and guides light from said light source to the stepped surface; and
   a light-condensing member faced to the stepped surface of said light guide plate to output exit light from the stepped surface of said light guide plate in a direction within a predetermined range.

2. A device according to claim 1, wherein said light guide plate has a reflection surface for reflecting light incident from one end, and the stepped surface has raised surfaces for outputting light guided by said light guide plate.

3. A device according to claim 2, wherein said light-condensing member comprises a prism member having an array of a plurality of prisms which refract exit light from the raised surfaces of the stepped surface in a direction in which an angle with respect to a normal to an envelope plane of the stepped surface decreases, and a condenser lens unit arranged in a light exit direction of said light-condensing member and having an array of a plurality of condenser lenses which condense and output the light refracted by said prism member in a predetermined range.

4. A device according to claim 3, wherein said condenser lens unit comprises a plurality of Fresnel lenses.

5. A device according to claim 3, wherein said condenser lens unit comprises a plurality of lenses arranged at a larger pitch than an array pitch of said prisms of said prism member.

6. A device according to claim 5, wherein each lens of said condenser lens unit is formed to oppose an odd number, not less than three prisms of said prism member.

7. A device according to claim 3, wherein said condenser lens unit comprises a lens array in which a plurality of fine lenses are arranged in each of longitudinal and lateral directions.

8. A device according to claim 7, wherein said fine lenses of said lens array are Fresnel lenses.

9. A device according to claim 2, wherein said light-condensing member comprises a plurality of columnar lenses with a substantially semicircular section arranged substantially parallel to one end face of said light guide plate, and each of said columnar lenses is arranged with a curved surface of said columnar lens opposing a corresponding one of the raised surfaces of the stepped surface of said light guide plate and with a flat surface of said columnar lens forming a predetermined angle with an envelope of the stepped surface.

10. A device according to claim 2, wherein said light-condensing member comprises a plurality of columnar lenses with a polygonal section arranged substantially parallel to one end face of said light guide plate, and each of said columnar lenses is arranged with one apex of the polygon of said columnar lens opposing a corresponding one of the raised surfaces forming the stepped surface of said light guide plate.

11. A device according to claim 1, wherein said light guide plate comprises a first partial light guide plate whose one end face is adjacent to said light source and another end face is distal to said light source, and a second partial light guide plate whose one end face is adjacent to said light source and another end face is distal to said light source, and the stepped surface comprises a first partial stepped surface formed on said first partial light guide plate and a second partial stepped surface formed on said second partial light guide plate, envelope planes of the first and second partial stepped surfaces being essentially equal to each other.

12. A device according to claim 1, wherein the stepped surface comprises a plurality of reflection regions for reflecting light incident from one end and a plurality of flat regions for outputting the light reflected by the reflection regions.

13. A device according to claim 1, wherein said light guide plate comprises optical interfaces which form a plurality of light guide regions in a one-to-one correspondence with steps on the stepped surface and guide light directed to the outside of said light guide regions in a direction of said light-condensing member.

14. A device according to claim 13, wherein the optical interfaces of said light guide plate are interfaces of low-refractive index layers formed in boundaries between the light guide regions and made from a substance having a refractive index smaller than a refractive index of said light guide plate.

15. A device according to claim 14, wherein said low-refractive index layers are air layers.

16. A surface light source device comprising:
    a light source;
    a light guide plate, formed from one block of an optically homogeneous transparent material, at one end of which said light source is arranged and which has an uneven surface having a plurality of projections for outputting light from said light source, which is incident from the one end, to a front surface;
    a prism unit faced to the uneven surface of said light guide plate and including a plurality of prisms which refract exit light from said light guide plate in a direction in which an angle with respect to a normal to said light guide plate decreases; and
    a light-condensing member arranged on an exit side of said prism unit and including a plurality of lenses which output exit light from said prism unit in a direction within a predetermined range.

17. A device according to claim 16, wherein the projections of said light guide plate are formed in a one-to-one correspondence with spaces between said prisms and have inclined surfaces for outputting light guided in said light guide plate.

18. A device according to claim 16, wherein the projections of said light guide plate form a plurality of prisms having light exit surfaces.

19. A liquid crystal display device including a surface light source, comprising:

a light source;

a light guide plate, formed from one block of an optically homogeneous transparent material, at one end of which said light source is arranged and which has a stepped surface whose thickness decreases step by step at a predetermined pitch from the one end to the other, and guides light from said light source to the stepped surface;

a light-condensing member arranged to oppose the stepped surface of said light guide plate to output exit light from the stepped surface of said light guide plate in a direction within a predetermined range; and a liquid crystal display element arranged on a light exit side of said light-condensing member and comprising a pair of substrates having electrodes opposing each other and a liquid crystal sealed between said substrates and oriented in a predetermined state.

20. A device according to claim 19, wherein said light guide plate has a reflection surface for reflecting light incident from one end, and the stepped surface has a plurality of raised surfaces for outputting light guided by said light guide plate; and said light-condensing member comprises a prism member having a plurality of prisms so arranged as to refract exit light from the raised surfaces of the stepped surface in a direction in which an angle with respect to a normal to an envelope plane of the stepped surface decreases, and a condenser lens unit having a plurality of condenser lenses arranged in a light exit direction of said light-condensing member so as to condense and output the light refracted by said prism member in a predetermined range.

21. A device according to claim 19, wherein said light-condensing member comprises a plurality of Fresnel lenses.

22. A device according to claim 19, wherein said light-condensing member comprises a plurality of columnar lenses with a polygonal section arranged nearly parallel to one end face of said light guide plate, and each of said columnar lenses is arranged with one apex of the polygon of said columnar lens opposing a corresponding one of the raised surfaces forming the stepped surface of said light guide plate.

23. A surface light source device comprising:

a light source;

a light guide plate at one end of which said light source is arranged and which has a stepped surface whose thickness decreases step by step at a predetermined pitch from the one end to the other, and guides light from said light source to the stepped surface; and a light-condensing member faced to the stepped surface of said light guide plate to output exit light from the stepped surface of said light guide plate in a direction within a predetermined range;

wherein said light-condensing member is a transparent plate formed from one block made of an optically homogeneous transparent material, said transparent plate integrally incorporating a prism unit on one side and a condenser lens unit on the other side, said other side having the prism unit arranged to face the stepped surface of said light guide plate.

24. A surface light source device comprising:

a light source;

a light guide plate at one end of which said light source is arranged and which has a stepped surface whose thickness decreases step by step at a predetermined pitch from the one end to the other, and guides light from said light source to the stepped surface; and a light-condensing member faced to the stepped surface of said light guide plate to output exit light from the stepped surface of said light guide plate in a direction within a predetermined range;

wherein said light guide plate has a reflection surface for reflecting light incident from one end, and the stepped surface has raised surfaces for outputting light guided by said light guide plate;

wherein said light-condensing member comprises:

a prism member having an array of a plurality of prisms which refract exit light from the raised surfaces of the stepped surface in a direction in which an angle with respect to a normal to an envelope plane of the stepped surface decreases; and a condenser lens unit arranged in a light exit direction of said light-condensing member and having an array of a plurality of condenser lenses which condense and output the light refracted by said prism member in a predetermined range; and wherein said condenser lens unit comprises a plurality of lenses arranged at a larger pitch than an array pitch of said prisms of said prism member.

25. A device according to claim 24, wherein each lens of said condenser lens units is formed to oppose an odd number, not less than three prisms of said prism member.

26. A surface light source device comprising:

a light source;

a light guide plate at one end of which said light source is arranged and which has a stepped surface whose thickness decreases step by step at a predetermined pitch from the one end to the other, and guides light from said light source to the stepped surface; and a light-condensing member faced to the stepped surface of said light guide plate to output exit light from the stepped surface of said light guide plate in a direction within a predetermined range;

wherein said light guide plate has a reflection surface for reflecting light incident from one end, and the stepped surface has raised surfaces for outputting light guided by said light guide plate; and wherein said light-condensing member comprises a plurality of columnar lenses with a substantially semicircular section arranged substantially parallel to one end face of said light guide plate, and each of said columnar lenses is arranged with a curved surface of said columnar lens opposing a corresponding one of the raised surfaces of the stepped surface of said light guide plate and with a flat surface of said columnar lens forming a predetermined angle with an envelope of the stepped surface.

27. A surface light source device comprising:

a light source;

a light guide plate at one end of which said light source is arranged and which has a stepped surface whose thickness decreases step by step at a predetermined pitch from the one end to the other, and guides light from said light source to the stepped surface; and a light-condensing member faced to the stepped surface of said light guide plate to output exit light from the stepped surface of said light guide plate in a direction within a predetermined range;

wherein said light guide plate has a reflection surface for reflecting light incident from one end, and the stepped surface has raised surfaces for outputting light guided by said light guide plate; and wherein said light-condensing member comprises a plurality of columnar lenses with a polygonal section arranged substantially parallel to one end face of said light guide plate, and each of said columnar lenses being arranged with one apex of the polygon of said columnar lens opposing a corresponding one of the raised surfaces forming the stepped surface of said light guide plate.

28. A surface light source device comprising:

a light source;

a light guide plate at one end of which said light source is arranged and which has a stepped surface whose thickness decreases step by step at a predetermined pitch from the one end to the other, and guides light from said light source to the stepped surface; and a light-condensing member faced to the stepped surface of said light guide plate to output exit light from the stepped surface of said light guide plate in a direction within a predetermined range;

wherein said light guide plate comprises optical interfaces which form a plurality of light guide regions in a one-to-one correspondence with steps on the stepped surface and guide light directed to the outside of said light guide regions in a direction of said light-condensing member.

29. A device according to claim 28, wherein the optical interfaces of said light guide plate are interfaces of low-refractive index layers formed in boundaries between the light guide regions and made from a substance having a refractive index smaller than a refractive index of said light guide plate.

30. A surface light source device comprising:

a light source;

a light guide plate at one end of which said light source is arranged and which has a surface having a plurality of projections for outputting light from said light source, which is incident from the one end, to a front surface;

a prism unit faced to the surface of said light guide plate and including a plurality of prisms which refract exit light from said light guide plate in a direction in which an angle with respect to a normal to said light guide plate decreases; and a light-condensing member arranged on an exit side of said prism unit and including a plurality of lenses which output exit light from said prism unit in a direction within a predetermined range;

wherein the projections of said light guide plate are formed in a one-to-one correspondence with spaces between said prisms and have inclined surfaces for outputting light guided in said light guide plate.

31. A liquid crystal display device including a surface light source, comprising:

a light source;

a light guide plate at one end of which said light source is arranged and which has a stepped surface whose thickness decreases step by step at a predetermined pitch from the one end to the other, and guides light from said light source to the stepped surface;

a light-condensing member arranged to oppose the stepped surface of said light guide plate to output exit light from the stepped surface of said light guide plate in a direction within a predetermined range; and a liquid crystal display element arranged on a light exit side of said light-condensing member and comprising a pair of substrates having electrodes opposing each other and a liquid crystal sealed between said substrates and oriented in a predetermined state;

wherein said light-condensing member comprises a plurality of columnar lenses with a polygonal section arranged nearly parallel to one end face of said light guide plate; and wherein each of said columnar lenses are arranged with one apex of the polygon of said columnar lens opposing a corresponding one of the raised surfaces forming the stepped surface of said light guide plate.

32. A device according to claim 31, wherein said low-refractive index layers are air layers.

* * * * *